(12) United States Patent
Chou et al.

(10) Patent No.: US 12,481,867 B2
(45) Date of Patent: Nov. 25, 2025

(54) MEMORY FOR ARTIFICIAL NEURAL NETWORK ACCELERATOR

(71) Applicant: Arm Limited, Cambridge (GB)

(72) Inventors: Teyuh Alice Chou, Ann Arbor, MI (US); Mudit Bhargava, Austin, TX (US); Supreet Jeloka, Austin, TX (US); Fernando Garcia Redondo, Cambridge (GB); Paul Nicholas Whatmough, Cambridge, MA (US)

(73) Assignee: Arm Limited, Cambridge (GB)

( * ) Notice: Subject to any disclaimer, the term of this patent is extended or adjusted under 35 U.S.C. 154(b) by 1181 days.

(21) Appl. No.: 17/242,721

(22) Filed: Apr. 28, 2021

(65) Prior Publication Data

US 2022/0351032 A1 Nov. 3, 2022

(51) Int. Cl.
*G06N 3/065* (2023.01)
*G06F 17/16* (2006.01)
*G11C 5/02* (2006.01)
*G11C 7/10* (2006.01)
*G11C 7/16* (2006.01)

(52) U.S. Cl.
CPC ............. *G06N 3/065* (2023.01); *G06F 17/16* (2013.01); *G11C 5/02* (2013.01); *G11C 7/1006* (2013.01); *G11C 7/16* (2013.01)

(58) Field of Classification Search
CPC ........... G06N 3/065; G06F 17/16; G11C 5/02; G11C 7/16; G11C 7/1006
See application file for complete search history.

(56) References Cited

U.S. PATENT DOCUMENTS

| | | | | |
|---|---|---|---|---|
| 5,630,024 | A * | 5/1997 | Aihara | G06N 3/048 706/41 |
| 6,539,368 | B1 * | 3/2003 | Chernikov | G06N 3/048 706/41 |
| 10,298,208 | B1 * | 5/2019 | Venkatramani | H01F 38/20 |
| 10,340,002 | B1 * | 7/2019 | Kim | G11C 13/0038 |
| 11,144,316 | B1 * | 10/2021 | Far | H03M 1/742 |
| 11,430,510 | B2 * | 8/2022 | Gong | G11C 11/2273 |
| 11,520,561 | B1 * | 12/2022 | Afzal | G06F 7/57 |
| 11,636,322 | B2 * | 4/2023 | Tran | G06F 7/78 706/38 |
| 11,829,729 | B2 * | 11/2023 | Eilert | G06F 17/16 |
| 11,902,685 | B1 * | 2/2024 | Tsai | H04N 25/79 |
| 11,956,560 | B2 * | 4/2024 | Tsai | H04N 25/59 |

(Continued)

*Primary Examiner* — Jeremy L Stanley
(74) *Attorney, Agent, or Firm* — Leveque Intellectual Property Law, P.C.

(57) ABSTRACT

A compute-in-memory (CIM) array module and a method for performing dynamic saturation detection for a CIM array are provided. The CIM array module includes a CIM array, saturation detection units (SDUs) and a controller. The CIM array includes selectable row signal lines, column signal lines and cells. Each cell is located at an intersection of a selectable row signal line and a column signal line, and each cell has a programmable conductance. The SDUs are selectively coupled to at least one column signal line, and each SDU is configured to, for each column signal line, generate an analog signal, and identify the column signal line as a saturated column signal line when a voltage of the analog signal is greater than a saturation threshold voltage, or a current of the analog signal is greater than a saturation threshold current.

20 Claims, 18 Drawing Sheets

(56) References Cited

U.S. PATENT DOCUMENTS

| | | | | |
|---|---|---|---|---|
| 11,962,928 B2* | 4/2024 | Reyserhove | ............ | H04N 25/77 |
| 2009/0292520 A1* | 11/2009 | Nwankpa | ................ | G06F 17/16 |
| | | | | 708/607 |
| 2013/0211757 A1* | 8/2013 | Miyamoto | ............ | G06F 3/0446 |
| | | | | 702/65 |
| 2016/0110643 A1* | 4/2016 | Basu | ................ | G06F 17/16 |
| | | | | 706/22 |
| 2016/0370207 A1* | 12/2016 | Quartiroli | ................ | G01D 5/56 |
| 2018/0024663 A1* | 1/2018 | Kurokawa | ............ | G09G 3/3266 |
| | | | | 345/173 |
| 2018/0121796 A1* | 5/2018 | Deisher | ................ | G10L 15/16 |
| 2018/0300605 A1* | 10/2018 | Ambardekar | ........ | H03M 7/3066 |
| 2019/0102170 A1* | 4/2019 | Chen | ................ | G11C 7/16 |
| 2019/0102359 A1* | 4/2019 | Knag | ................ | G11C 11/418 |
| 2019/0138893 A1* | 5/2019 | Sharma | ................ | H10B 12/01 |
| 2019/0237137 A1* | 8/2019 | Buchanan | ............ | G11C 13/0007 |
| 2019/0379388 A1* | 12/2019 | Gao | ................ | H03M 1/361 |
| 2020/0117699 A1* | 4/2020 | Kim | ................ | G06N 3/00 |
| 2020/0202202 A1* | 6/2020 | Chava | ................ | G11C 7/1069 |
| 2020/0310803 A1* | 10/2020 | Gradstein | ............ | G06F 9/30038 |
| 2020/0327402 A1* | 10/2020 | Lesso | ................ | G06F 7/16 |
| 2020/0394252 A1* | 12/2020 | Kim | ................ | G06N 3/065 |
| 2021/0050060 A1* | 2/2021 | Li | ................ | G11C 7/1006 |
| 2021/0072957 A1* | 3/2021 | Eilert | ................ | G06F 7/5443 |
| 2021/0072958 A1* | 3/2021 | Welsh | ................ | G06F 7/57 |
| 2021/0181268 A1* | 6/2021 | Towne | ................ | G01R 35/00 |
| 2021/0279556 A1* | 9/2021 | Gokmen | ................ | G11C 13/004 |
| 2021/0313345 A1* | 10/2021 | Or-Bach | ................ | H10B 41/35 |
| 2021/0350217 A1* | 11/2021 | Tran | ................ | G06N 3/045 |
| 2021/0358551 A1* | 11/2021 | Tran | ................ | G11C 16/3459 |
| 2021/0383869 A1* | 12/2021 | Tran | ................ | G11C 16/0433 |
| 2021/0406690 A1* | 12/2021 | Ramachandran | ........ | G06N 20/10 |
| 2022/0005866 A1* | 1/2022 | Yamada | ................ | G06N 3/065 |
| 2022/0013180 A1* | 1/2022 | Hsu | ................ | G11C 16/0433 |
| 2022/0028444 A1* | 1/2022 | Papageorgiou | ............ | G06N 3/08 |
| 2022/0076737 A1* | 3/2022 | Cosemans | ................ | G06J 1/00 |
| 2022/0100816 A1* | 3/2022 | Wang | ................ | G11C 7/1006 |
| 2022/0165311 A1* | 5/2022 | Kimura | ................ | G11C 11/419 |
| 2022/0180167 A1* | 6/2022 | Karunaratne | ........ | G06N 3/065 |
| 2022/0188628 A1* | 6/2022 | Rasch | ................ | G06N 3/08 |
| 2022/0262432 A1* | 8/2022 | Chih | ................ | G11C 13/0038 |
| 2023/0097217 A1* | 3/2023 | Rasch | ................ | G06N 3/045 |
| | | | | 706/25 |
| 2023/0131251 A1* | 4/2023 | Edo Vivancos | ........ | G06N 3/045 |
| | | | | 711/170 |
| 2023/0147770 A1* | 5/2023 | Hirose | ................ | G11C 11/4023 |
| | | | | 365/45 |
| 2023/0252276 A1* | 8/2023 | Tran | ................ | G06N 3/065 |
| | | | | 706/38 |
| 2023/0253034 A1* | 8/2023 | Kimura | ................ | G11C 7/1006 |
| | | | | 365/154 |
| 2023/0274779 A1* | 8/2023 | Yamazaki | ............ | G06N 3/065 |
| 2023/0283276 A1* | 9/2023 | Ikeda | ................ | H01L 29/7869 |
| | | | | 327/427 |
| 2023/0306246 A1* | 9/2023 | Tran | ................ | G11C 29/028 |
| 2023/0325645 A1* | 10/2023 | Tran | ................ | G06N 3/063 |
| | | | | 706/15 |
| 2023/0325646 A1* | 10/2023 | Tran | ................ | G06N 3/0442 |
| | | | | 706/27 |
| 2023/0335173 A1* | 10/2023 | Yamazaki | ............ | G11C 11/221 |
| 2023/0352477 A1* | 11/2023 | Matsuzaki | ........ | H01L 29/7869 |
| 2023/0386544 A1* | 11/2023 | Godo | ................ | H01L 29/40111 |
| 2024/0111987 A1* | 4/2024 | Yang | ................ | G06N 3/065 |
| 2024/0121532 A1* | 4/2024 | Saito | ................ | H01L 27/14609 |

* cited by examiner

MEMORY FOR ARTIFICIAL NEURAL NETWORK ACCELERATOR

BACKGROUND

The present disclosure relates to computer systems. More particularly, the present disclosure relates to computer systems including artificial neural networks (ANNs).

ANNs, such as deep neural networks (DNNs), convolutional neural networks (CNNs), etc., are a popular solution to a wide array of challenging classification, recognition and regression problems. However, many ANNs require a large number of calculations involving a large number of filter weights and activations, which presents a significant challenge with respect to access, storage and performance, particularly for mobile and other power or storage-constrained devices. An ANN hardware accelerator accelerates these calculations, such as, for example, general matrix multiplication (GEMM) operations performed by DNNs, convolution operations performed by CNNs, etc.

CNNs typically do not perform native convolution operations due to the complicated dataflow and expensive datapaths that are required. Instead, native convolution operations are converted into GEMM operations, which are then executed more efficiently by a central processing unit (CPU), a specialized processor, an ANN accelerator that includes systolic, digital multiply-and-accumulate (MAC) arrays or analog arrays, etc. An analog accelerator may include one or more compute-in-memory (CIM) array modules that perform GEMM operations, such as, for example, MAC operations. Each CIM array module includes an analog array and signal processing circuitry that includes digital-to-analog converters (DACs), sample-and-hold (S/H) circuits, analog-to-digital converters (ADCs), etc. A CIM array module may be based on volatile or non-volatile memory (NVM), such as, for example, an NVM crossbar array.

Generally, matrices may be classified as either sparse or dense. Most elements of a sparse matrix have a value of zero, while most elements of a dense matrix have a non-zero value. For the simple matrix multiplication operation C=A·B, when matrix A or matrix B is sparse, most of the matrix calculations will include a value of zero for at least one of the operands, which always results in a product that has a value of zero. When both matrix A and matrix B are sparse, an even greater number of matrix calculations will include a value of zero for at least one of the operands.

Two of the biggest hardware costs for an analog accelerator, in terms of power and area, are the S/H circuit capacitors and the ADCs. Because the size of the capacitors and the resolution of the ADCs are selected to multiply dense matrices, an analog accelerator multiplies sparse matrices very inefficiently due to the large number of operands that have a value of zero. In other words, the size of the capacitors within the S/H circuits is larger, and the resolution of the ADCs is higher, than are needed to multiply sparse matrices.

BRIEF DESCRIPTION OF THE DRAWINGS

FIG. 3A depicts a CIM array module, while

DETAILED DESCRIPTION

Figure 1:
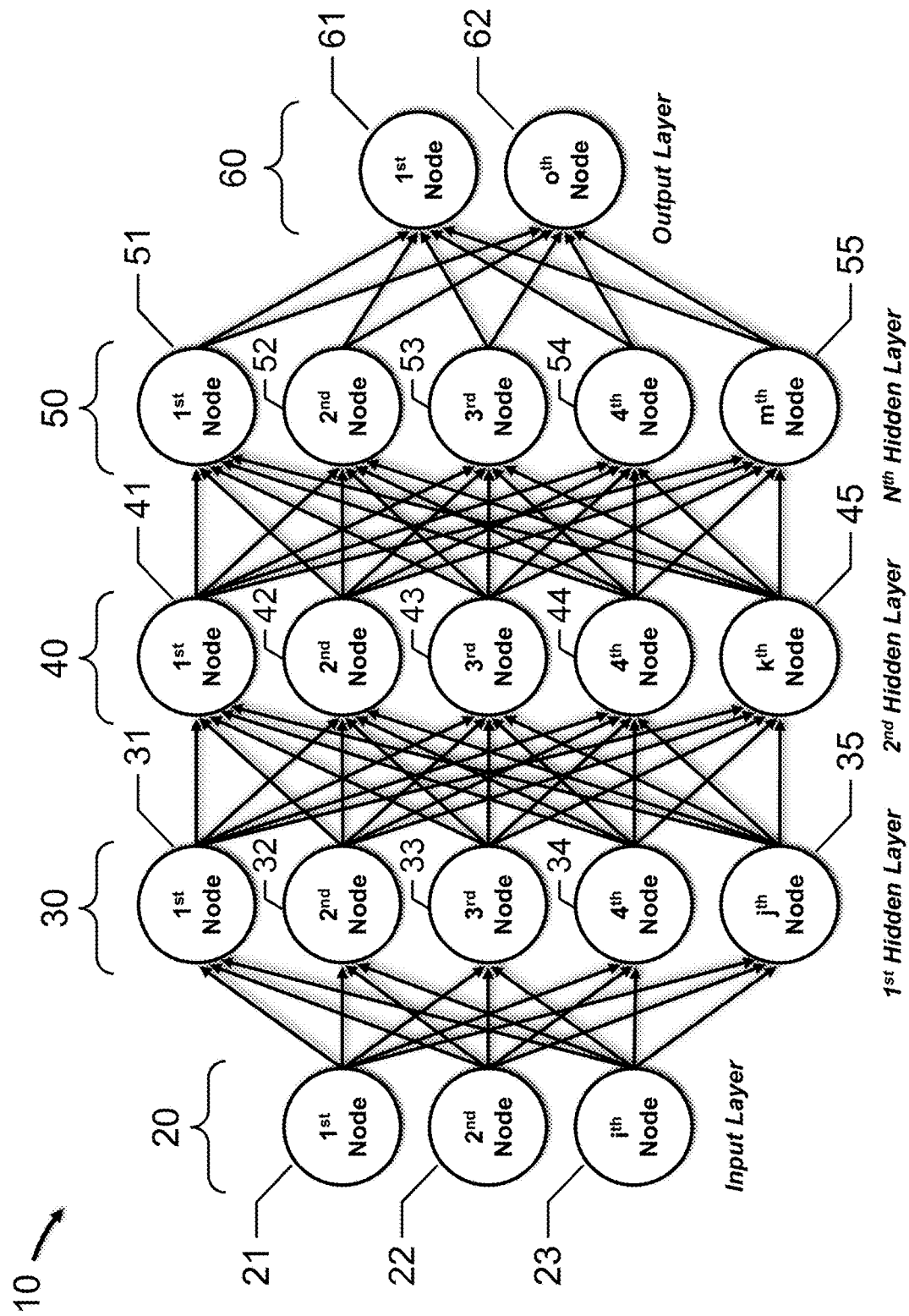
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure provide a CIM array module that advantageously provides iso-accuracy performance using saturation detection units (SDUs) with significantly smaller capacitors than S/H circuit capacitors, and ADCs with significantly smaller resolution.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

A multi-layer perceptron (MLP) is an ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes. Many variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

Figure 2A:
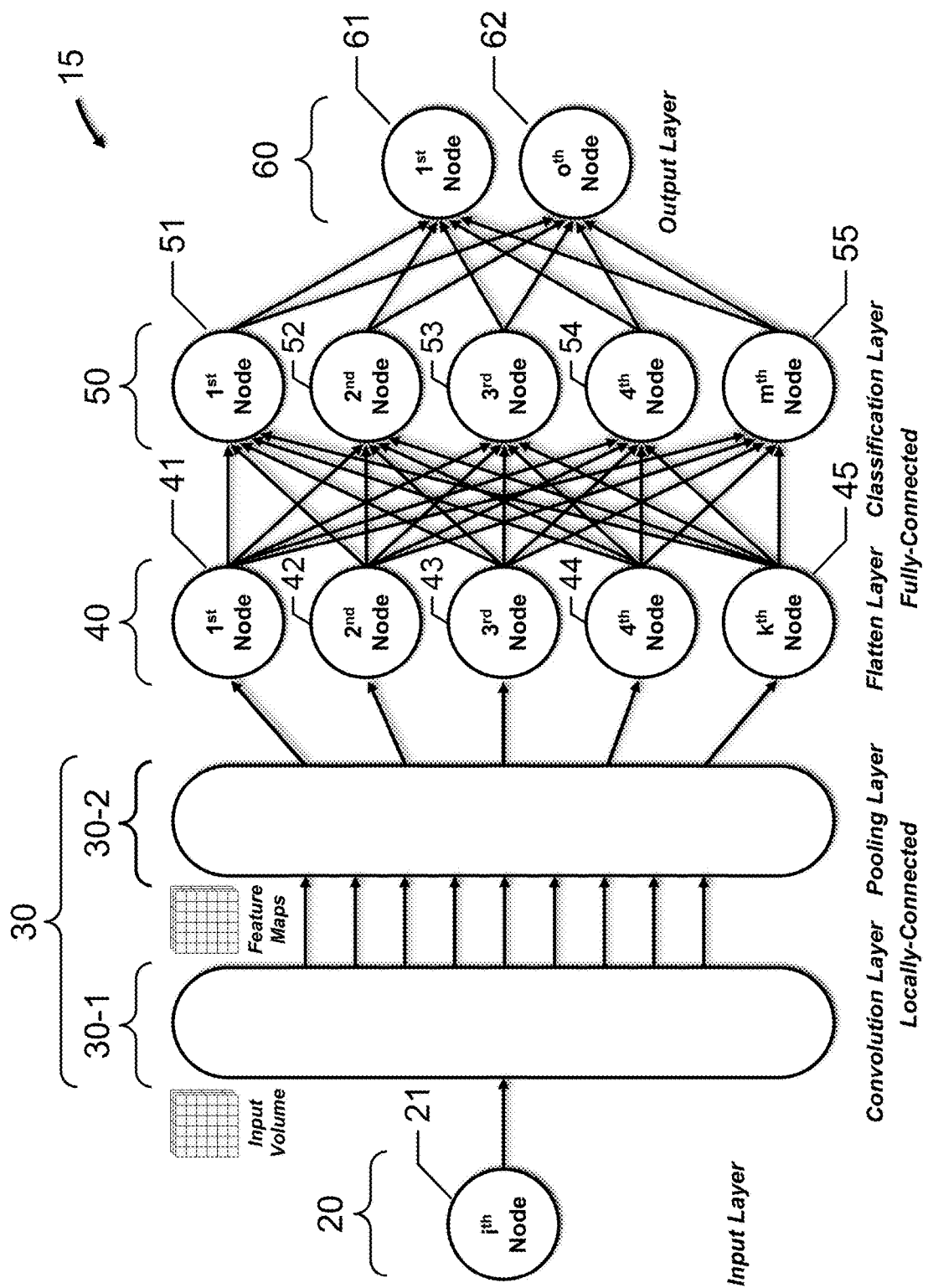
FIG. 2A depicts a CNN, in accordance with an embodiment of the present disclosure.

FIG. 2A depicts CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image may be presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume to generate one element of an output volume. An activation function and a bias may be applied to each element of the output volume, and the output volume is then provided as the input volume to the next layer. The activation function and bias may be applied by each convolutional layer node or by the nodes of a subsequent locally-connected layer, such as an ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as output feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten)

layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, MAC operations, are used extensively by CNNs, as well as other ANNs.

Figure 2B:
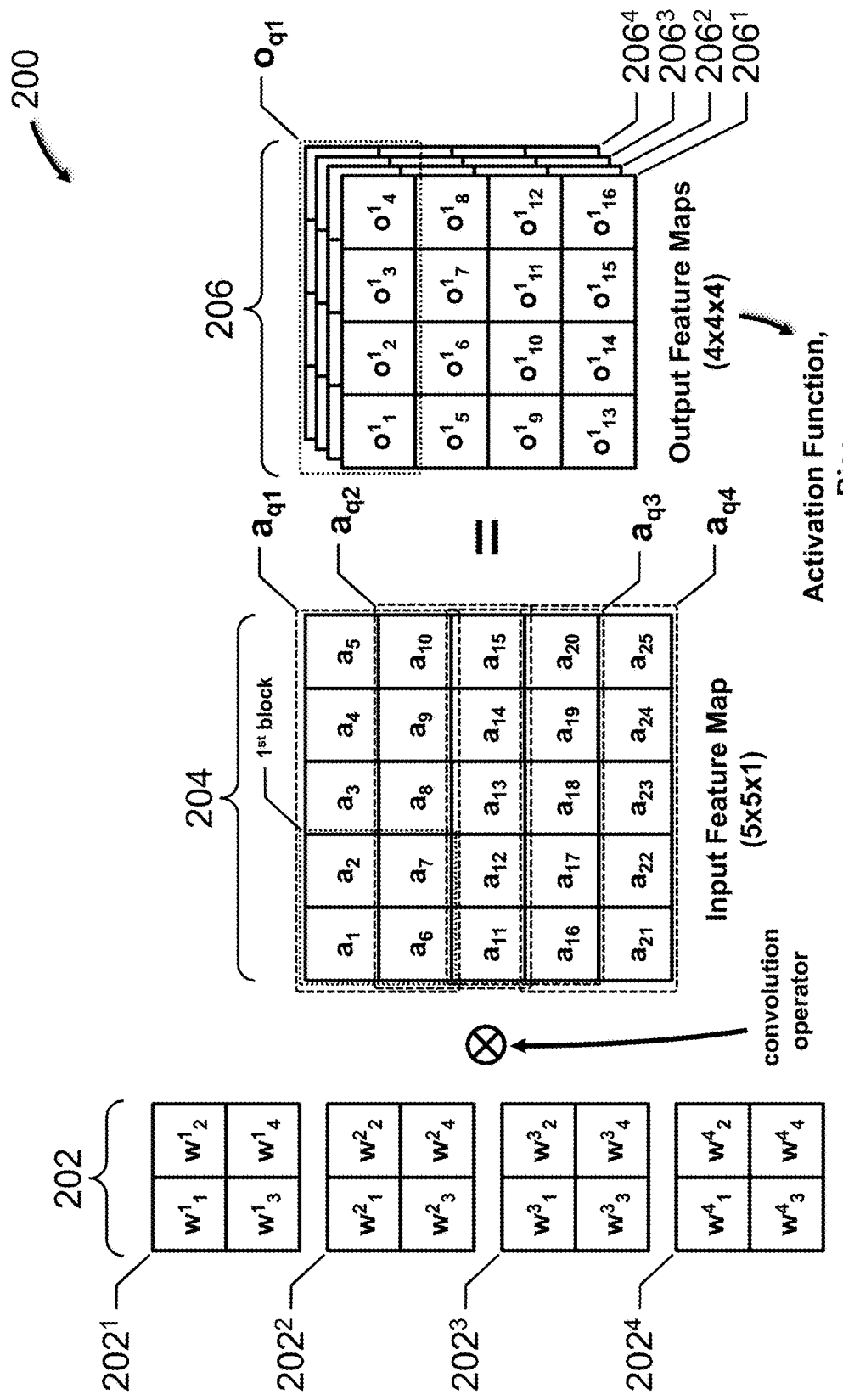
FIG. 2B depicts a convolution layer operation within a convolutional layer of a CNN, in accordance with an embodiment of the present disclosure.

FIG. 2B depicts convolution layer operation 200 within convolutional layer 30-1 of CNN 15, in accordance with an embodiment of the present disclosure.

A convolutional layer generally includes M filters, C input channels, C input feature maps (i.e., one input feature map for each input channel) and M output feature maps (i.e., one output feature map for each filter). Each filter has C weight sets (i.e., each filter has a weight set for each input channel), and is convolved across the input feature maps to produce an output feature map corresponding to that filter. Convolutional layers generally require the movement of large amounts of data, generate a significant computational load, and require buffers of considerable size to store intermediate values.

In this embodiment, convolutional layer 30-1 includes four weight matrices or filters 202, i.e., filter $202^1$, $202^2$, $202^3$ and $202^4$, one input channel, one input feature map 204 and four output feature maps 206, i.e., $206^1$, $206^2$, $206^3$ and $206^4$. Each filter 202 is convolved across input feature map 204 to produce an output feature map 206 corresponding to that filter, i.e., output feature map $206^1$ corresponds to filter $202^1$, output feature map $206^2$ corresponds to filter $202^2$, output feature map $206^3$ corresponds to filter $202^3$, and output feature map $206^4$ corresponds to filter $202^4$. For illustration purposes, each filter $202^1$, $202^2$, $202^3$ and $202^4$ is a 2×2×1 weight matrix, input feature map 204 is a 5×5×1 input data matrix, and each output feature map $206^1$, $206^2$, $206^3$ and $206^4$ is a 4×4 output data matrix. In this embodiment, with a stride of 1 and no padding, the total number of MAC operations performed by convolution layer operation 200 is (2×2×1)×(4×4)×4 or 256.

For ease of discussion, input feature map 204 may be divided into four overlapping portions or quadrants. The first quadrant (i.e., $a_{q1}$) includes the first and second rows, i.e., $a_1$, $a_2$, $a_3$, $a_4$, $a_5$ and $a_6$, $a_7$, $a_8$, $a_9$, $a_{10}$, the second quadrant includes the second and third rows, i.e., $a_6$, $a_7$, $a_8$, $a_9$, $a_{10}$ and $a_{11}$, $a_{12}$, $a_{13}$, $a_{14}$, $a_{15}$, the third quadrant includes the third and fourth rows, i.e., $a_{11}$, $a_{12}$, $a_{13}$, $a_{14}$, $a_{15}$ and $a_{16}$, $a_{17}$, $a_{18}$, $a_{19}$, $a_{20}$, and the fourth quadrant includes the fourth and fifth rows, i.e., $a_{16}$, $a_{17}$, $a_{18}$, $a_{19}$, $a_{20}$ and $a_{21}$, $a_{22}$, $a_{23}$, $a_{24}$, $a_{25}$.

Figure 2C:
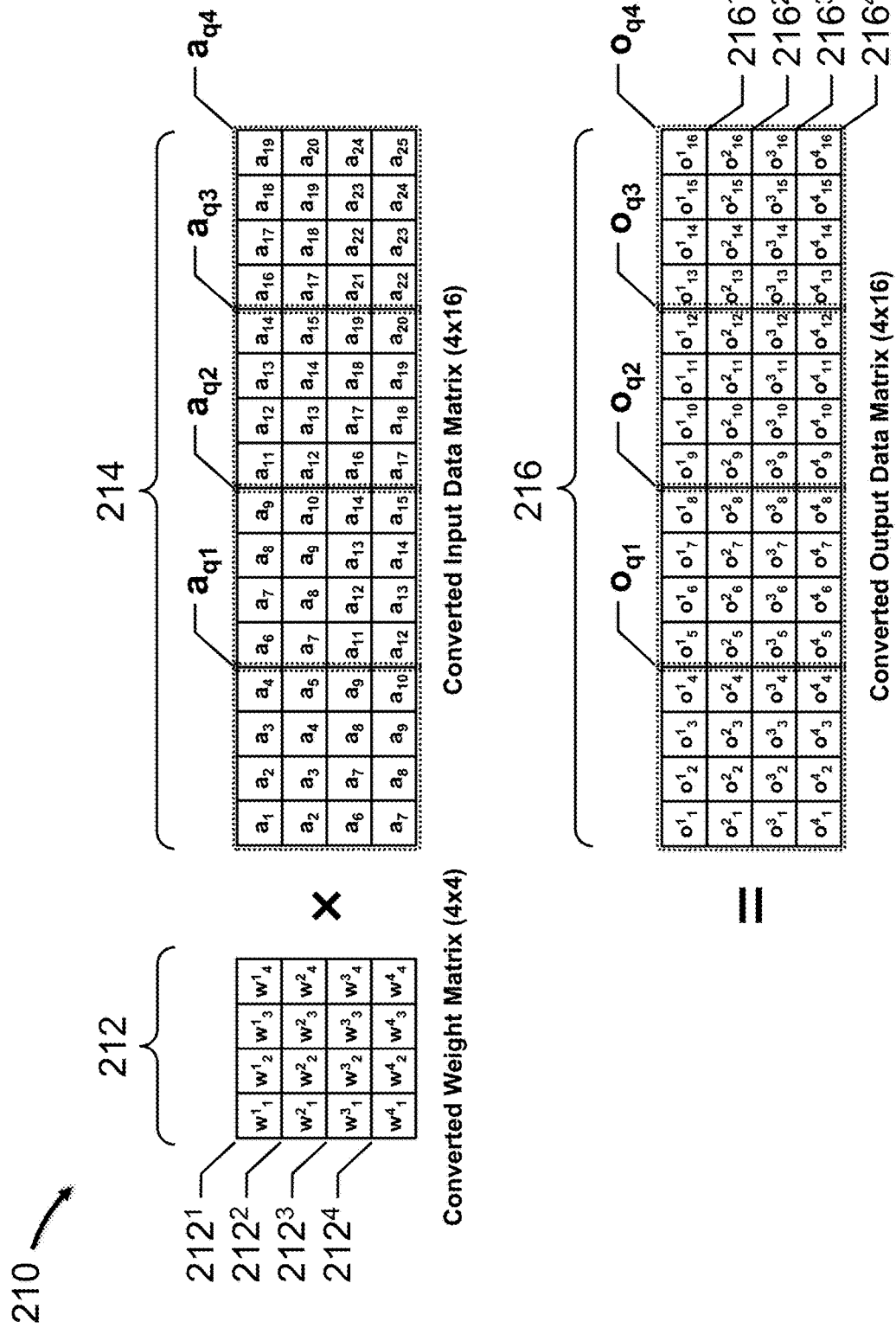
FIG. 2C depicts a converted convolutional operation within a convolutional layer of a CNN, in accordance with an embodiment of the present disclosure.

Similarly, output feature maps 206 may be divided into four, three dimensional portions or quadrants. The first quadrant (i.e., $o_{q1}$) includes the first row of each output feature map $206^1$, $206^2$, $206^3$ and $206^4$, i.e., $o^1_1$, $o^1_2$, $o^1_3$, $o^1_4$, $o^2_1$, $o^2_2$, $o^2_3$, $o^2_4$, $o^3_1$, $o^3_2$, $o^3_3$, $o^3_4$, $o^4_1$, $o^4_2$, $o^4_3$ and $o^4_4$. The second quadrant (not shown for clarity) includes the second row of each output feature map $206^1$, $206^2$, $206^3$ and $206^4$, i.e., $o^1_5$, $o^1_6$, $o^1_7$, $o^1_8$, $o^2_5$, $o^2_6$, $o^2_7$, $o^2_8$, $o^3_5$, $o^3_6$, $o^3_7$, $o^3_8$, $o^4_5$, $o^4_6$, $o^4_7$ and $o^4_8$. The third quadrant (not shown for clarity) includes the third row of each output feature map $206^1$, $206^2$, $206^3$ and $206^4$, i.e., $o^1_9$, $o^1_{10}$, $o^1_{11}$, $o^1_{12}$, $o^2_9$, $o^2_{10}$, $o^2_{11}$, $o^2_{12}$, $o^3_9$, $o^3_{10}$, $o^3_{11}$, $o^3_{12}$, $o^4_9$, $o^4_{10}$, $o^4_{11}$, and $o^4_{12}$. The fourth quadrant (not shown for clarity) includes the fourth row of each output feature map $206^1$, $206^2$, $206^3$ and $206^4$, i.e., $o^1_{13}$, $o^1_{14}$, $o^1_{15}$, $o^1_{16}$, $o^2_{13}$, $o^2_{14}$, $o^2_{15}$, $o^2_{16}$, $o^3_{13}$, $o^3_{14}$, $o^3_{15}$, $o^3_{16}$, $o^4_{13}$, $o^4_{14}$, $o^4_{15}$, and $o^4_{16}$. All of the elements from quadrants $o_{q1}$, $o_{q2}$, $o_{q3}$ and $o_{q4}$ are depicted in FIG. 2C.

The convolution operations performed on the first quadrant (i.e., $a_q1$) of input feature map 204 are now discussed in detail.

For output feature map $206^1$, element $o^1_1$ is the dot product of filter $202^1$ and the first block (i.e., $a_1$, $a_2$, $a_6$ and $a_7$) of the first quadrant $a_{q1}$ of input feature map 204, element $o^1_2$ is the dot product of filter $202^1$ and the second block (i.e., $a_2$, $a_3$, $a_7$ and $a_8$) of the first quadrant $a_{q1}$ of input feature map 204, element $o^1_3$ is the dot product of filter $202^1$ and the third block (i.e., $a_3$, $a_4$, $a_8$ and $a_9$) of the first quadrant $a_{q1}$ of input feature map 204, and $o^1_4$ is the dot product of filter $202^1$ and the fourth block (i.e., $a_4$, $a_5$, $a_9$ and $a_{10}$) of the first quadrant $a_{q1}$ of input feature map 204.

More particularly, the dot product of filter $202^1$ and the first block of the first quadrant $a_{q1}$ is equal to $w^1_1 \cdot a_1 + w^1_2 \cdot a_2 + w^1_3 \cdot a_6 + w^1_4 \cdot a_7$ (i.e., $o^1_1$). The dot product of filter $202^1$ and the second block of the first quadrant $a_{q1}$ is equal to $w^1_1 \cdot a_2 + w^1_2 \cdot a_3 + w^1_3 \cdot a_7 + w^1_4 \cdot a_8$ (i.e., $o^1_2$). The dot product of filter $202^1$ and the third block of the first quadrant $a_{q1}$ is equal to $w^1_1 \cdot a_3 + w^1_2 \cdot a_4 + w^1_3 \cdot a_8 + w^1_4 \cdot a_9$ (i.e., $o^1_3$). The dot product of filter $202^1$ and the fourth block of the first quadrant $a_{q1}$ is equal to $w^1_1 \cdot a_4 + w^1_2 \cdot a_5 + w^1_3 \cdot a_9 + w^1_4 \cdot a_{10}$ (i.e., $o^1_4$).

For output feature map $206^2$, element $o^2_1$ is the dot product of filter $202^2$ and the first block (i.e., $a_1$, $a_2$, $a_6$ and $a_7$) of the first quadrant $a_{q1}$ of input feature map 204, output feature map element $o^2_2$ is the dot product of filter $202^2$ and the second block (i.e., $a_2$, $a_3$, $a_7$ and $a_8$) of the first quadrant $a_{q1}$ of input feature map 204, output feature map element $o^2_3$ is the dot product of filter $202^2$ and the third block (i.e., $a_3$, $a_4$, $a_8$ and $a_9$) of the first quadrant $a_{q1}$ of input feature map 204, and output feature map element $o^2_4$ is the dot product of filter $202^2$ and the fourth block (i.e., $a_4$, $a_5$, $a_9$ and $a_{10}$) of the first quadrant $a_{q1}$ of input feature map 204.

More particularly, the dot product of filter $202^2$ and the first block of the first quadrant $a_{q1}$ is equal to $w^2_1 \cdot a_1 + w^2_2 \cdot a_2 + w^2_3 \cdot a_6 + w^2_4 \cdot a_7$ (i.e., $o^2_1$). The dot product of filter $202^2$ and the second block of the first quadrant $a_{q1}$ is equal to $w^2_1 \cdot a_2 + w^2_2 \cdot a_3 + w^2_3 \cdot a_7 + w^2_4 \cdot a_8$ (i.e., $o^2_2$). The dot product of filter $202^2$ and the third block of the first quadrant $a_{q1}$ is equal to $w^2_1 \cdot a_3 + w^2_2 \cdot a_4 + w^2_3 \cdot a_8 + w^2_4 \cdot a_9$ (i.e., $o^2_3$). The dot product of filter $202^2$ and the fourth block of the first quadrant $a_{q1}$ is equal to $w^2_1 \cdot a_4 + w^2_2 \cdot a_5 + w^2_3 \cdot a_9 + w^2_4 \cdot a_{10}$ (i.e., $o^2_4$).

For output feature map $206^3$, element $o^3_1$ is the dot product of filter $202^3$ and the first block (i.e., $a_1$, $a_2$, $a_6$ and $a_7$) of the first quadrant $a_{q1}$ of input feature map 204, output feature map element $o^3_2$ is the dot product of filter $202^3$ and the second block (i.e., $a_2$, $a_3$, $a_7$ and $a_8$) of the first quadrant $a_{q1}$ of input feature map 204, output feature map element $o^3_3$ is the dot product of filter $202^3$ and the third block (i.e., $a_3$, $a_4$, $a_8$ and $a_9$) of the first quadrant $a_{q1}$ of input feature map 204, and output feature map element $o^3_4$ is the dot product of filter $202^3$ and the fourth block (i.e., $a_4$, $a_5$, $a_9$ and $a_{10}$) of the first quadrant $a_{q1}$ of input feature map 204.

More particularly, the dot product of filter $202^3$ and the first block of the first quadrant $a_{q1}$ is equal to $w^3_1 \cdot a_1 + w^3_2 \cdot a_2 + w^3_3 \cdot a_6 + w^3_4 \cdot a_7$ (i.e., $o^3_1$). The dot product of filter $202^3$ and the second block of the first quadrant $a_{q1}$ is equal to $w^3_1 \cdot a_2 + w^3_2 \cdot a_3 + w^3_3 \cdot a_7 + w^3_4 \cdot a_8$ (i.e., $o^3_2$). The dot product of filter $202^3$ and the third block of the first quadrant $a_{q1}$ is equal to $w^3_1 \cdot a_3 + w^3_2 \cdot a_4 + w^3_3 \cdot a_8 + w^3_4 \cdot a_9$ (i.e., $o^3_3$). The dot product of filter $202^3$ and the fourth block of the first quadrant $a_{q1}$ is equal to $w^3_1 \cdot a_4 + w^3_2 \cdot a_5 + w^3_3 \cdot a_9 + w^3_4 \cdot a_{10}$ (i.e., $o^3_4$).

For output feature map $206^4$, element $o^4_1$ is the dot product of filter $202^4$ and the first block (i.e., $a_1$, $a_2$, $a_6$ and $a_7$) of the first quadrant $a_{q1}$ of input feature map 204, output feature map element $o^4_2$ is the dot product of filter $202^4$ and the second block (i.e., $a_2$, $a_3$, $a_7$ and $a_8$) of the first quadrant $a_{q1}$ of input feature map 204, output feature map element $o^4_3$ is the dot product of filter $202^4$ and the third block (i.e., $a_3$, $a_4$, $a_8$ and $a_9$) of the first quadrant $a_{q1}$ of input feature map 204, and output feature map element $o^4_4$ is the dot product of filter $202^4$ and the fourth block (i.e., $a_4$, $a_5$, $a_9$ and $a_{10}$) of the first quadrant $a_{q1}$ of input feature map 204.

More particularly, the dot product of filter $202^4$ and the first block of the first quadrant $a_{q1}$ is equal to $w^4_1 \cdot a_1 + w^4_2 \cdot a_2 + w^4_3 \cdot a_6 + w^4_4 \cdot a_7$ (i.e., $o^4_1$). The dot product of filter $202^4$ and the second block of the first quadrant $a_{q1}$ is equal to $w^4_1 \cdot a_2 + w^4_2 \cdot a_3 + w^4_3 \cdot a_7 + w^4_4 \cdot a_8$ (i.e., $o^4_2$). The dot product of filter $202^4$ and the third block of the first quadrant $a_{q1}$ is equal to $w^4_1 \cdot a_3 + w^4_2 \cdot a_4 + w^4_3 \cdot a_8 + w^4_4 \cdot a_9$ (i.e., $o^4_3$). The dot product of filter $202^4$ and the fourth block of the first quadrant $a_{q1}$ is equal to $w^4_1 \cdot a_4 + w^4_2 \cdot a_5 + w^4_3 \cdot a_9 + w^4_4 \cdot a_{10}$ (i.e., $o^4_4$).

The convolution operations performed on the remaining three quadrants of input feature map 204 are done in the same manner. The second quadrant of input feature map 204 also includes four blocks, i.e., the first block of includes $a_6$, $a_7$, $a_{11}$ and $a_{12}$, the second block includes $a_7$, $a_8$, $a_{12}$ and $a_{13}$, the third block includes $a_8$, $a_9$, $a_{13}$ and $a_{14}$, and the fourth block includes $a_9$, $a_{10}$, $a_{14}$ and $a_{15}$. The third quadrant of input feature map 204 also includes four blocks, i.e., the first block of includes $a_{11}$, $a_{12}$, $a_{16}$ and $a_{17}$, the second block includes $a_{12}$, $a_{13}$, $a_{17}$ and $a_{18}$, the third block includes $a_{13}$, $a_{14}$, $a_{18}$ and $a_{19}$, and the fourth block includes aid, $a_{15}$, $a_{19}$ and $a_{20}$. The fourth quadrant of input feature map 204 also includes four blocks, i.e., the first block of includes $a_{16}$, $a_{17}$, $a_{21}$ and $a_{22}$, the second block includes $a_{17}$, $a_{18}$, $a_{22}$ and $a_{23}$, the third block includes $a_{18}$, $a_{19}$, $a_{23}$ and $a_{24}$, and the fourth block includes $a_{19}$, $a_{20}$, $a_{24}$ and $a_{25}$.

For the second quadrant of output feature map $206^1$, element $o^1_5$ is the dot product of filter $202^1$ and the first block of the second quadrant of input feature map 204, element $o^1_6$ is the dot product of filter $202^1$ and the second block of the second quadrant of input feature map 204, element $o^1_7$ is the dot product of filter $202^1$ and the third block of the second quadrant of input feature map 204, and element $o^1_8$ is the dot product of filter $202^1$ and the fourth block of the second quadrant of input feature map 204. For the second quadrant of output feature map $206^2$, elements $o^2_5$, $o^2_6$, $o^2_7$, and $o^2_8$ are calculated in the same manner using filter $202^2$. For the second quadrant of output feature map $206^3$, elements $o^3_5$, $o^3_6$, $o^3_7$, and $o^3_8$ are calculated in the same manner using filter $202^3$. For the second quadrant of output feature map $206^4$, elements $o^4_5$, $o^4_6$, $o^4_7$, and $o^4_8$ are calculated in the same manner using filter $202^4$.

For the third quadrant of output feature map $206^1$, element $o^1_9$ is the dot product of filter $202^1$ and the first block of the third quadrant of input feature map 204, element $o^1_{10}$ is the dot product of filter $202^1$ and the second block of the third quadrant of input feature map 204, element $o^1 11$ is the dot product of filter $202^1$ and the third block of the third quadrant of input feature map 204, and element $o^1_{12}$ is the dot product of filter $202^1$ and the fourth block of the third quadrant of input feature map 204. For the third quadrant of output feature map $206^2$, elements $o^2_9$, $o^2_{10}$, $o^2_{11}$, and $o^2_{12}$ are calculated in the same manner using filter $202^2$. For the third quadrant of output feature map $206^3$, elements $o^3_9$, $o^3_{10}$, $o^3_{11}$, and $o^3_{12}$ are calculated in the same manner using filter $202^3$. For the third quadrant of output feature map $206^4$, elements $o^4_9$, $o^4_{10}$, $o^4_{11}$, and $o^4_{12}$ are calculated in the same manner using filter $202^4$.

For the fourth quadrant of output feature map $206^1$, element $o^1_{13}$ is the dot product of filter $202^1$ and the first block of the fourth quadrant of input feature map 204, element $o^1_{14}$ is the dot product of filter $202^1$ and the second block of the fourth quadrant of input feature map 204, element $o^1_{15}$ is the dot product of filter $202^1$ and the third block of the fourth quadrant of input feature map 204, and element $o^1_{16}$ is the dot product of filter $202^1$ and the fourth block of the fourth quadrant of input feature map 204. For the fourth quadrant of output feature map $206^2$, elements $o^2_{13}$, $o^2_{14}$, $o^2_{15}$, and $o^2_{16}$ are calculated in the same manner using filter $202^2$. For the fourth quadrant of output feature map $206^3$, elements $o^3_{13}$, $o^3_{14}$, $o^3_{15}$, and $o^3_{16}$ are calculated in the same manner using filter $202^3$. For the fourth quadrant of output feature map $206^4$, elements $o^4_{13}$, $o^4_{14}$, $o^4_{15}$, and $o^4_{16}$ are calculated in the same manner using filter $202^4$.

An activation function and a bias may be applied to each element of output feature maps 206, which are then provided as the input feature maps 204 to the next layer. An activation function and bias may be applied after each element of output feature maps 206 is calculated, after all of the elements of output feature maps 206 are calculated, or by a subsequent locally-connected layer, such as an ReLU layer.

Similar to the fully-connected layer calculations for ANNs, convolution operations may be recast as generic matrix multiplication (GEMM) operations, and implemented in an ANN hardware accelerator using one or more arrays of MAC units, an analog accelerator with one or more CIM array modules, etc. The filter weights and activations (i.e., input feature maps or IFMs) for the convolution operation are converted into an expanded format (e.g., IM2COL format), and then processed as GEMM operations by the ANN hardware accelerator to generate output feature maps (OFMs).

FIG. 2C depicts a converted convolutional operation 210 within convolutional layer 30-1 of CNN 15, in accordance with an embodiment of the present disclosure.

In this embodiment, convolution layer operation 200 has been converted into a simple matrix multiplication operation by converting filter 202 into converted weight matrix 212, converting input feature map 204 into converted input data matrix 214, and converting output feature maps 206 into converted output data matrix 216. Converted weight matrix 212 (4×4) and converted input data matrix 214 (4×16) are multiplied to generate converted output data matrix 216 (4×16), which includes output data sets $216^1$, $216^2$, $216^3$ and $216^4$ (each 1×16). Output data sets $216^1$, $216^2$, $216^3$ and $216^4$ are then reformed into output feature maps $206^1$, $206^2$, $206^3$ and $206^4$ (each 4×4), respectively.

Converted weight matrix 212 includes converted weight sets $212^1$, $212^2$, $212^3$ and $212^4$. Converted weight set $212^1$ includes the elements of filter $202^1$, i.e., $w^1_1$, $w^1_2$, $w^1_3$ and $w^1_4$ arranged in a single (first) row. Converted weight set $212^2$ includes the elements of filter $202^2$, i.e., $w^2_1$, $w^2_2$, $w^2_3$ and $w^2_4$ flattened into a single (second) row. Converted weight set $212^3$ includes the elements of filter $202^3$, i.e., $w^3_1$, $w^3_2$, $w^3_3$ and $w^3_4$ flattened into a single (third) row. Converted weight set $212^4$ includes the elements of filter $202^4$, i.e., $w^4_1$, $w^4_2$, $w^4_3$ and $w^4_4$ flattened into a single (fourth) row.

Converted input data matrix 214 includes the elements of input feature map 204 recast as a larger matrix that implements the convolution operation as a simple matrix multiplication operation. Due to the mechanics of the convolution operation (discussed above), certain elements of input feature map 204 are duplicated once, twice or three times to generate converted output data matrix 216. Generally, each row of converted weight matrix 212 is a filter, each column of converted input data matrix 214 is a block of input data upon which each filter operates, and each dot product calculation, i.e., the multiplication of each row by each column, generates a different element of converted output data matrix 216.

For ease of discussion, converted input data matrix 214 may be divided into four portions or quadrants, i.e., $a_{q1}$, $a_{q2}$, $a_{q3}$ and $a_{q4}$, and converted output data matrix 216 may be divided into four portions or quadrants, i.e., $o_{q1}$, $o_{q2}$, $o_{q3}$ and $o_{q4}$.

The first quadrant $a_{q1}$ of converted input data matrix 214 includes the four blocks of the first quadrant of input feature map 204, each block arranged as a column.

Similarly, the second quadrant $a_{q2}$ of converted input data matrix 214 includes the four blocks of the second quadrant of input feature map 204, each block arranged as a column. The third quadrant $a_{q3}$ of converted input data matrix 214 includes the four blocks of the third quadrant of input feature map 204, each block arranged as a column. And, the fourth quadrant $a_{q4}$ of converted input data matrix 214 includes the four blocks of the fourth quadrant of input feature map 204, each block arranged as a column.

More particularly, the first column of the first quadrant $a_{q}i$ of converted input data matrix 214 includes elements $a_1$, $a_2$, $a_6$ and $a_7$, which are the same elements in the same sequence (i.e., row-major order) as the first block of the first quadrant of input feature map 204. The second column of the first quadrant $a_{q1}$ of converted input data matrix 214 includes elements $a_2$, $a_3$, $a_7$ and $a_8$, which are the same elements in the same sequence (i.e., row-major order) as the second block of the first quadrant of input feature map 204. The third column of the first quadrant $a_{q1}$ of converted input data matrix 214 includes elements $a_3$, $a_4$, $a_8$ and $a_9$, which are the same elements in the same sequence (i.e., row-major order) as the third block of the first quadrant of input feature map 204. The fourth column of the first quadrant $a_{q1}$ of converted input data matrix 214 includes elements $a_4$, $a_5$, $a_9$ and $a_{10}$, which are the same elements in the same sequence (i.e., row-major order) as the fourth block of the first quadrant of input feature map 204. And so on for quadrants $a_{q2}$, $a_{q3}$ and $a_{q4}$ of converted input data matrix 214.

The first row of the first quadrant $o_{q1}$ of converted output data matrix 216 includes elements $o^1_1$, $o^1_2$, $o^1_3$ and $o^1_4$, which are the same elements in the same sequence as the first row of the first quadrant of output feature map $206^1$. The second row of the first quadrant $o_{q1}$ of converted output data matrix 216 includes elements $o^2_1$, $o^2_2$, $o^2_3$ and $o^2_4$, which are the same elements in the same sequence as the first row of the first quadrant of output feature map $206^2$. The third row of the first quadrant $o_{q1}$ of converted output data matrix 216 includes elements $o^3_1$, $o^3_2$, $o^3_3$ and $o^3_4$, which are the same elements in the same sequence as the first row of the first quadrant of output feature map $206^3$. The fourth row of the first quadrant $o_{q1}$ of converted output data matrix 216 includes elements $o^4_1$, $o^4_2$, $o^4_3$ and $o^4_4$, which are the same elements in the same sequence as the first row of the first quadrant of output feature map $206^4$. And so on for quadrants $o_{q2}$, $o_{q3}$ and $o_{q4}$ of converted output data matrix 216.

To generate the first quadrant $o_{q1}$ of converted output data matrix 216, converted weight matrix 212 and the first quadrant $a_{q1}$ of converted input data matrix 214 are multiplied together. For the first row of the first quadrant $o_{q1}$, element $o^1_1$ is the dot product of the first row of converted weight matrix 212 and the first column of converted input data matrix 214, i.e., $o^1_1$ is equal to $w^1_1 \cdot a_1 + w^1_2 \cdot a_2 + w^1_3 \cdot a_6 + w^1_4 \cdot a_7$. Element $o^1_2$ is the dot product of the first row of converted weight matrix 212 and the second column of converted input data matrix 214, i.e., $o^1_2$ is equal to $w^1_1 \cdot a_2 + w^1_2 \cdot a_3 + w^1_3 \cdot a_7 + w^1_4 \cdot a_8$. Element $o^1_3$ is the dot product of the first row of converted weight matrix 212 and the third column of converted input data matrix 214, i.e., $o^1_3$ is equal to $w^1_1 \cdot a_3 + w^1_2 \cdot a_4 + w^1_3 \cdot a_8 + w^1_4 \cdot a_9$. Element $o^1_4$ is the dot product of the first row of converted weight matrix 212 and the fourth column of converted input data matrix 214, i.e., $o^1_4$ is equal to $w^1_1 \cdot a_4 + w^1_2 \cdot a_5 + w^1_3 \cdot a_5 + w^1_4 a_{10}$. The elements of the second, third and fourth rows the first quadrant $o_q^1$ of converted output data matrix 216, i.e., elements $o^2_1$, $o^2_2$, $o^2_3$, $o^2_4$, $o^3_1$, $o^3_2$, $o^3_3$, $o^3_4$, $o^4_1$, $o^4_2$, $o^4_3$ and $o^4_4$, are calculated in the same manner using the second, third and fourth rows of converted weight matrix 212, respectively.

To generate the second quadrant $o_{q2}$ of converted output data matrix 216, converted weight matrix 212 and the second quadrant $a_{q2}$ of converted input data matrix 214 are multiplied together. For the first row of the second quadrant $o_{q2}$, element $o^1_5$ is the dot product of the first row of converted weight matrix 212 and the fifth column of converted input data matrix 214, i.e., $o^1_5$ is equal to $w^1_1 \cdot a_6 + w^1_2 \cdot a_7 + w^1_3 \cdot a_{11} + w^1_4 \cdot a_{12}$. Element $o^1_6$ is the dot product of the first row of converted weight matrix 212 and the sixth column of converted input data matrix 214, i.e., $o^1_6$ is equal to $w^1_1 \cdot a_7 + w^1_2 \cdot a_8 + w^1_3 \cdot a_9 + w^1_4 \cdot a_{13}$. Element $o^1_7$ is the dot product of the first row of converted weight matrix 212 and the seventh column of converted input data matrix 214, i.e., $o^1_7$ is equal to $w^1_1 \cdot a_8 + w^1_2 \cdot a_9 + w^1_3 \cdot a_{13} + w^1_4 \cdot a_{14}$. Element $o^1_8$ is the dot product of the first row of converted weight matrix 212 and the eighth column of converted input data matrix 214, i.e., $o^1_8$ is equal to $w^1_1 \cdot a_9 + w^1_2 a_{12} + w^1_3 \cdot a_{14} + w^1_4 \cdot a_{15}$. The elements of the second, third and fourth rows the second quadrant $o_q^2$ of converted output data matrix 216, i.e., elements $o^2_5$, $o^2_6$, $o^2_7$, $o^2_8$, $o^3_5$, $o^3_6$, $o^3_7$, $o^3_8$, $o^4_5$, $o^4_6$, $o^4_7$ and $o^4_8$, are calculated in the same manner using the second, third and fourth rows of converted weight matrix 212, respectively.

To generate the third quadrant $o_{q3}$ of converted output data matrix 216, converted weight matrix 212 and the third quadrant $a_{q3}$ of converted input data matrix 214 are multiplied together. For the first row of the third quadrant $o_{q3}$, element $o^1_9$ is the dot product of the first row of converted weight matrix 212 and the ninth column of converted input data matrix 214, i.e., $o^1_9$ is equal to $w^1_1 \cdot a_{11} + w^1_2 \cdot a_{12} + w^1_3 \cdot a_{16} + w^1_4 \cdot a_{17}$. Element $o^1_{10}$ is the dot product of the first row of converted weight matrix 212 and the $10^{th}$ column of converted input data matrix 214, i.e., $o^1_{10}$ is equal to $w^1_1 \cdot a_{12} + w^1_2 \cdot a_{13} + w^1_3 \cdot a_{17} + w^1_4 \cdot a_8$. Element $o^1_{11}$ is the dot product of the first row of converted weight matrix 212 and the $11^{th}$ column of converted input data matrix 214, i.e., $o^1_{11}$ is equal to $w^1_1 \cdot a_{13} + w^1_2 \cdot a_{14} + w^1_3 \cdot a_{18} + w^1_4 \cdot a_{19}$. Element $o^1_{12}$ is the dot product of the first row of converted weight matrix 212 and the 12$^{th}$ column of converted input data matrix 214, i.e., $o^1_{12}$ is equal to $w^1_1 \cdot a_{14} + w^1_2 \cdot a_{15} + w^1_3 \cdot a_{19} + w^1_4 \cdot a_{20}$. The elements of the second, third and fourth rows the third quadrant $o_{q3}$ of converted output data matrix 216, i.e., elements $o^2_9, o^2_{10}, o^2_{11}, o^2_{12}, o^3_9, o^3_{10}, o^3_{11}, o^3_{12}, o^4_9, o^4_{10}, o^4_{11}$ and $o^4_{12}$, are calculated in the same manner using the second, third and fourth rows of converted weight matrix 212, respectively.

To generate the fourth quadrant $o_{q4}$ of converted output data matrix 216, converted weight matrix 212 and the fourth quadrant $a_{q4}$ of converted input data matrix 214 are multiplied together. For the first row of the fourth quadrant $o_{q4}$, element $o^1_{13}$ is the dot product of the first row of converted weight matrix 212, and the 13$^{th}$ column of converted input data matrix 214, i.e., $o^1_{13}$ is equal to $w^1_1 \cdot a_{16} + w^1_2 \cdot a_{17} + w^1_3 \cdot a_{21} + w^1_4 \cdot a_{22}$. Element $o^1_{14}$ is the dot product of the first row of converted weight matrix 212 and the 14$^{th}$ column of converted input data matrix 214, i.e., $o^1_{14}$ is equal to $w^1_1 \cdot a_{17} + w^1_2 \cdot a_{18} + w^1_3 \cdot a_{22} + w^1_4 \cdot a_{23}$. Element $o^1_{15}$ is the dot product of the first row of converted weight matrix 212 and the 15$^{th}$ column of converted input data matrix 214, i.e., $o^1_{15}$ is equal to $w^1_1 \cdot a_{18} + w^1_2 \cdot a_{19} + w^1_3 \cdot a_{23} + w^1_4 \cdot a_{24}$. Element $o^1_{16}$ is the dot product of the first row of converted weight matrix 212 and the 16$^{th}$ column of converted input data matrix 214, i.e., $o^1_{16}$ is equal to $w^1_1 \cdot a_{19} + w^1_2 \cdot a_{20} + w^1_3 \cdot a_{24} + w^1_4 \cdot a_{25}$.

The elements of the second, third and fourth rows the fourth quadrant $o_{q4}$ of converted output data matrix 216, i.e., elements $o^2_{13}, o^2_{14}, o^2_{15}, o^2_{16}, o^3_{13}, o^3_{14}, o^3_{15}, o^3_{16}, o^4_{13}, o^4_{14}, o^4_{15}$ and $o^4_{16}$, are calculated in the same manner using the second, third and fourth rows of converted weight matrix 212, respectively.

In another embodiment, converted weight matrix 212 and converted input data matrix 214 may be transposed and the order of multiplication reversed to generate the transpose of converted output data matrix 216, in accordance with the matrix properties of $A \cdot B = C$ and $(A \cdot B)_T = B^T \cdot A^T = C^T$.

Figure 3A:
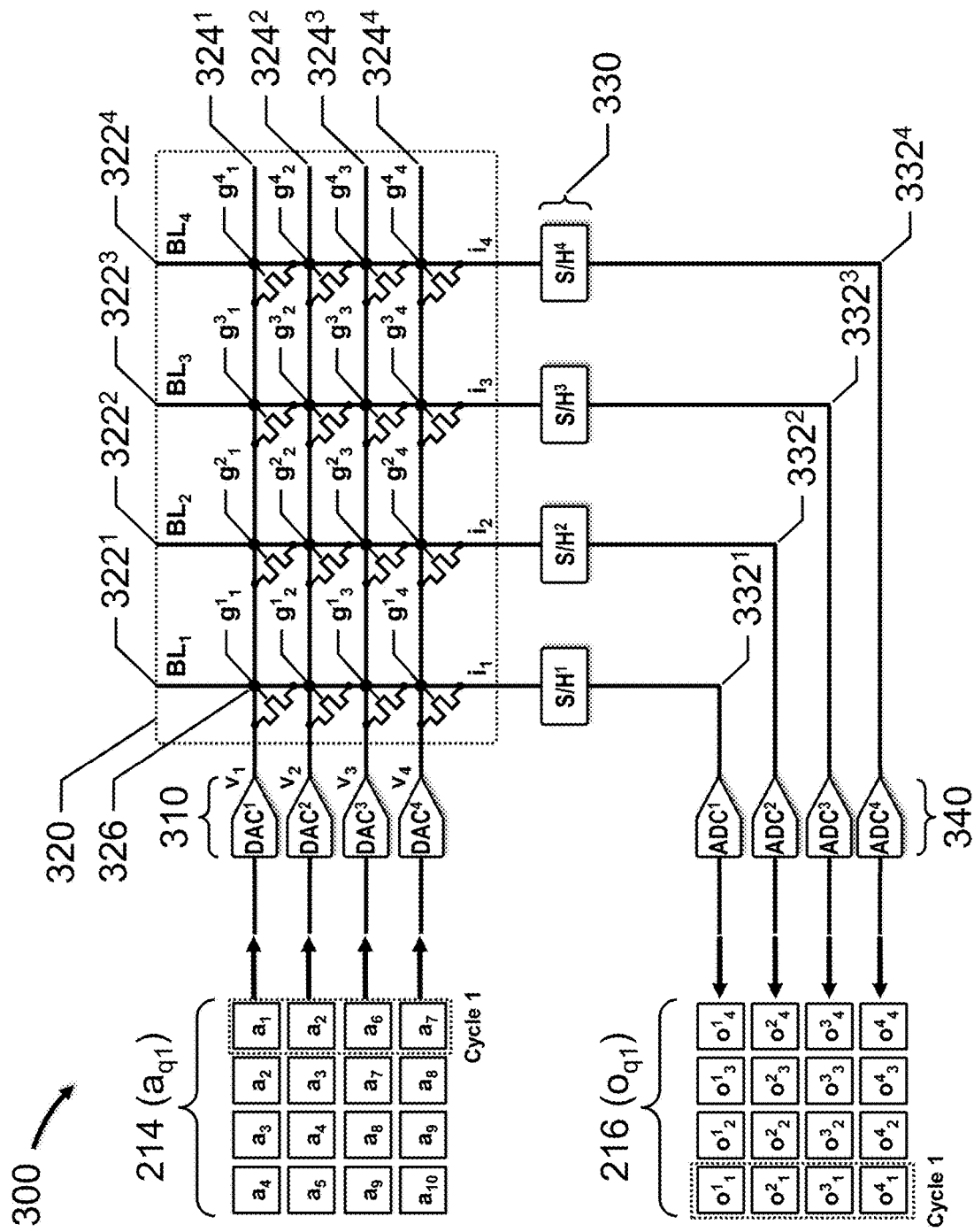

FIG. 3A depicts CIM array module 300.

GEMM operations may be implemented in an analog accelerator that includes one or more CIM array modules 300. Each CIM array module 300 includes signal processing circuitry and CIM array 320 that performs analog MAC operations. In this example, converted convolution operation 210 may be implemented by CIM array module 300.

The signal processing circuitry for CIM array module 300 includes, inter alia, DACs 310 (i.e., DAC$^1$, DAC$^2$, DAC$^3$ and DAC$^4$), S/H circuits 330 (i.e., S/H$^1$, S/H$^2$, S/H$^3$ and S/H$^4$), and ADCs 340 (i.e., ADC$^1$, ADC$^2$, ADC$^3$ and ADC$^4$). CIM array 320 includes four bit lines (BLs) or column signal lines 322, i.e., column signal lines 322$^1$, 322$^2$, 322$^3$ and 322$^4$, four word lines (WLs) or row signal lines 324, i.e., row signal lines 324$^1$, 324$^2$, 324$^3$ and 324$^4$, and sixteen cells 326, one disposed at each intersection of column signal lines 322 and row signal lines 324. DACs 310 are coupled to row signal lines 324, S/H circuits 330 are coupled to column signal lines 322, and ADCs 340 are coupled to S/H circuits 330 via sampled signal lines 332 (i.e., sampled signal lines 332$^1$, 332$^2$, 332$^3$ and 332$^4$).

Each cell 326 includes a programmable volatile or non-volatile element, such as, for example, random access memory (RAM), static random access memory (SRAM), dynamic random access memory (DRAM), phase change memory (PCM), resistive random access memory (RRAM), magnetic RAM (MRAM), correlated electron RAM (Ce-RAM), etc. CIM array 320 leverages a combination of Ohm's law and Kirchhoff's current law to implement analog MAC operations in parallel. According to Ohm's law, the application of a voltage across cell 326 generates a current that is proportional to the voltage across cell 326 divided by the programmed resistance of cell 326. Since conductance (in siemens) is the reciprocal of resistance (in ohms), the application of a voltage across cell generates a current that is proportional to the product of the conductance of the cell 326 and the voltage across cell 326. According to Kirchhoff's current law, currents from cells 326 in the same column of CIM array 320 combine to generate an accumulated current (i.e., the sum of the products generated by cells 326 in that column, $i_i$). Thus, CIM array 320 implements analog MAC operations in parallel through the combination of Ohm's law and Kirchhoff's current law, and, in this example, each column of cells 326 calculates a dot product, between a row of converted weight matrix 212 and a column of converted input data matrix 214, to generate an element of converted output data matrix 216.

In many embodiments, the programmable element within each cell 326 includes a resistive switching element that has a low-resistance state (LRS), e.g., $R_{on}$, and a high-resistance state (HRS), e.g., $R_{off}$. Due to the wide separation between the LRS and the HRS, each cell may be programmed to encode a discrete, linearly-separated conductance value. Weights $w^1_1, w^1_2, w^1_3, w^1_4, w^2_1, w^2_2, w^2_3, w^2_4, w^3_1, w^3_2, w^3_3, w^3_4, w^4_1, w^4_2, w^4_3$ and $w^4_4$ are converted to conductances $g^1_1, g^1_2, g^1_3, g^1_4, g^2_1, g^2_2, g^2_3, g^2_4, g^3_1, g^3_2, g^3_3, g^3_4, g^4_1, g^4_2, g^4_3$ and $g^4_4$, respectively, an cells 326 are programmed with these conductance values.

The calculation of the elements of the first column of converted output data matrix 216, i.e., elements $o^1_1, o^2_1, o^3_1$ and $o^4_1$, are discussed in detail below. The remaining columns of converted output data matrix 216 are calculated in the same manner.

Element $o^1_1$ is the dot product of the first row of converted weight matrix 212 and the first column of converted input data matrix 214, i.e., $o^1_1$ is equal to $w^1_1 \cdot a_1 + w^1_2 \cdot a_2 + w^1_3 \cdot a_6 + w^1_4 \cdot a_7$, which is equivalent to $g^1_1 \cdot v_1 + g^1_2 \cdot v_2 + g^1_3 \cdot v_3 + g^1_4 \cdot v_4$. Element $o^2_1$ is the dot product of the second row of converted weight matrix 212 and the first column of converted input data matrix 214, i.e., $o^2_1$ is equal to $w^2_1 \cdot a_1 + w^2_2 \cdot a_2 + w^2_3 \cdot a_6 + w^2_4 \cdot a_7$, which is equivalent to $g^2_1 \cdot v_1 + g^2_2 \cdot v_2 + g^2_3 \cdot v_3 + g^2_4 \cdot v_4$. Element $o^3_1$ is the dot product of the third row of converted weight matrix 212 and the first column of converted input data matrix 214, i.e., $o^3_1$ is equal to $w^3_1 \cdot a_1 + w^3_2 \cdot a_2 + w^3_3 \cdot a_6 + w^3_4 \cdot a_7$, which is equivalent to $g^3_1 \cdot v_1 + g^3_2 \cdot v_2 + g^3_3 \cdot v_3 + g^3_4 \cdot v_4$. Element $o^4_1$ is the dot product of the fourth row of converted weight matrix 212 and the first column of converted input data matrix 214, i.e., $o^4_1$ is equal to $w^4_1 \cdot a_1 + w^4_2 \cdot a_2 + w^4_3 \cdot a_6 + w^4_4 \cdot a_7$, which is equivalent to $g^4_1 \cdot v_1 + g^4_2 \cdot v_2 + g^4_3 \cdot v_3 + g^4_4 \cdot v_4$.

During the first processing cycle, the elements of the first column of converted input data matrix 214, i.e., activations $a_1, a_2, a_6$ and $a_7$, are input to DACs 310, converted into analog signals (i.e., voltage levels), and the respective voltages $v_1, v_2, v_3$ and $v_4$ are applied along row signal lines 324. BL signal currents $i_1, i_2, i_3$ and $i_4$, are generated in column signal lines 322$^1$, 322$^2$, 322$^3$ and 322$^4$, respectively, based on the voltages of each row signal line 324 and the conductances of each respective cell 326. BL signals $BL_1, BL_2, BL_3$, and $BL_4$ are sampled by S/H circuits 330$^1$, 330$^2$, 330$^3$ and 330$^4$, output over sampled signal lines 332$^1$, 332$^2$, 332$^3$ and 332$^4$, and then digitized by ADCs 340$^1$, 340$^2$, 340$^3$ and 340$^4$ to generate the elements of the first column of converted output data matrix 216.

An activation function and a bias may be applied to each element of the converted output data matrix to generate the elements of output feature maps 206, which are then provided as input feature maps 204 to the next layer. The activation function and bias may be applied after each element of the converted output data matrix is calculated, after all of the elements of the converted output data matrix are calculated, or by a subsequent locally-connected layer, such as an ReLU layer.

As discussed above, activations are input to DACs 310, converted into analog signals (i.e., voltage levels), and the respective voltages are applied along row signal lines 324. In many embodiments, each activation is a digital amplitude value that is converted by DAC 310 into an analog voltage that has a corresponding amplitude value. In these embodiments, DACs 310 are integrated circuits (ICs), such as, for example, metal oxide semiconductor (MOS) mixed-signal ICs that include both analog and digital circuits. In other embodiments, each activation is a digital value that represents the duty cycle, D, of a pulse width modulated (PWM) signal that has a period, T. In these embodiments, DACs 310 include an electronic component that generates a PWM signal, such as a microcontroller, field programmable gate array (FPGA), complex programmable logic device (CPLD), etc., and a low pass, RC filter. The duty cycle value of the PWM signal is converted by DAC 310 into an analog voltage that has a corresponding amplitude value.

As discussed above, one of the biggest hardware costs for an analog accelerator is the capacitor used within each S/H circuit 330, which must be sized to discharge the maximum current, $i_{max}$, that may be generated on each column signal line 322. Generally, the maximum value for a dot product calculation is produced when each weight has a maximum value, $w_{max}$, and each activation has a maximum value, amax. Accordingly, max is generated when each cell 326 on a column signal line 322 is programmed to a maximum conductance value, $g_{max}$, that is proportional to a maximum weight value, $w_{max}$, and the respective DAC 310 outputs a maximum voltage value, $v_{max}$, that is proportional to a maximum activation value, $a_{max}$. In other words, if $g_{max}$ $v_{max}$ generates the maximum current for a single cell 236, $i_{cell}$, then $i_{max}$ may be expressed as $n \cdot i_{cell}$, where n is the number of cells 326 that are on the column signal line 322.

The speed or rate at which the capacitor within the S/H circuit 330 is discharged is directly related to the amount of current generated by the dot product calculation for a column signal line 322, i.e., the higher the current generated by the dot product calculation the faster the capacitor discharges. Generally, the size of the capacitor may be given by Equation 1:

$$C \propto i_{max} * t_{discharge} = n * i_{cell} * t_{discharge} \quad \text{Eq. 1}$$

where C is the capacitance of the capacitor, and $t_{discharge}$ is the capacitor discharge time.

In addition to properly sizing the capacitor in each S/H circuit 330, each ADC 340 must have a resolution, in bits, that accommodates the number of possible voltage levels engendered by $i_{max}$.

Unfortunately, when C is sized based on i max, a very large area overhead is created which overprovisions CIM array 320 when converted input data matrix 214 and converted weight matrix 212 are sparse matrices. For example, if converted input data matrix 214 has 50% sparsity and converted weight matrix 212 has 50% sparsity, then, at most, only 50% (i.e., n/2) of cells 326 will generate a current for a dot product calculation on any particular column signal line 322. On average, only about 25% (i.e., n/4) of cells 326 will generate a current for a dot product calculation on any particular column signal line 322.

Consequently, an analog accelerator multiplies sparse matrices very inefficiently due to the large number of activations and weights that have a value of zero. In other words, the predetermined size of the capacitors within S/H circuits 330 is larger, and the predetermined resolution of ADCs 340 is higher, than are needed to multiply sparse matrices.

Embodiments of the present disclosure provide a CIM array module that advantageously provides iso-accuracy performance using saturation detection units (SDUs) with significantly smaller capacitors than S/H circuit capacitors, and ADCs with significantly smaller resolution.

Figure 3B:
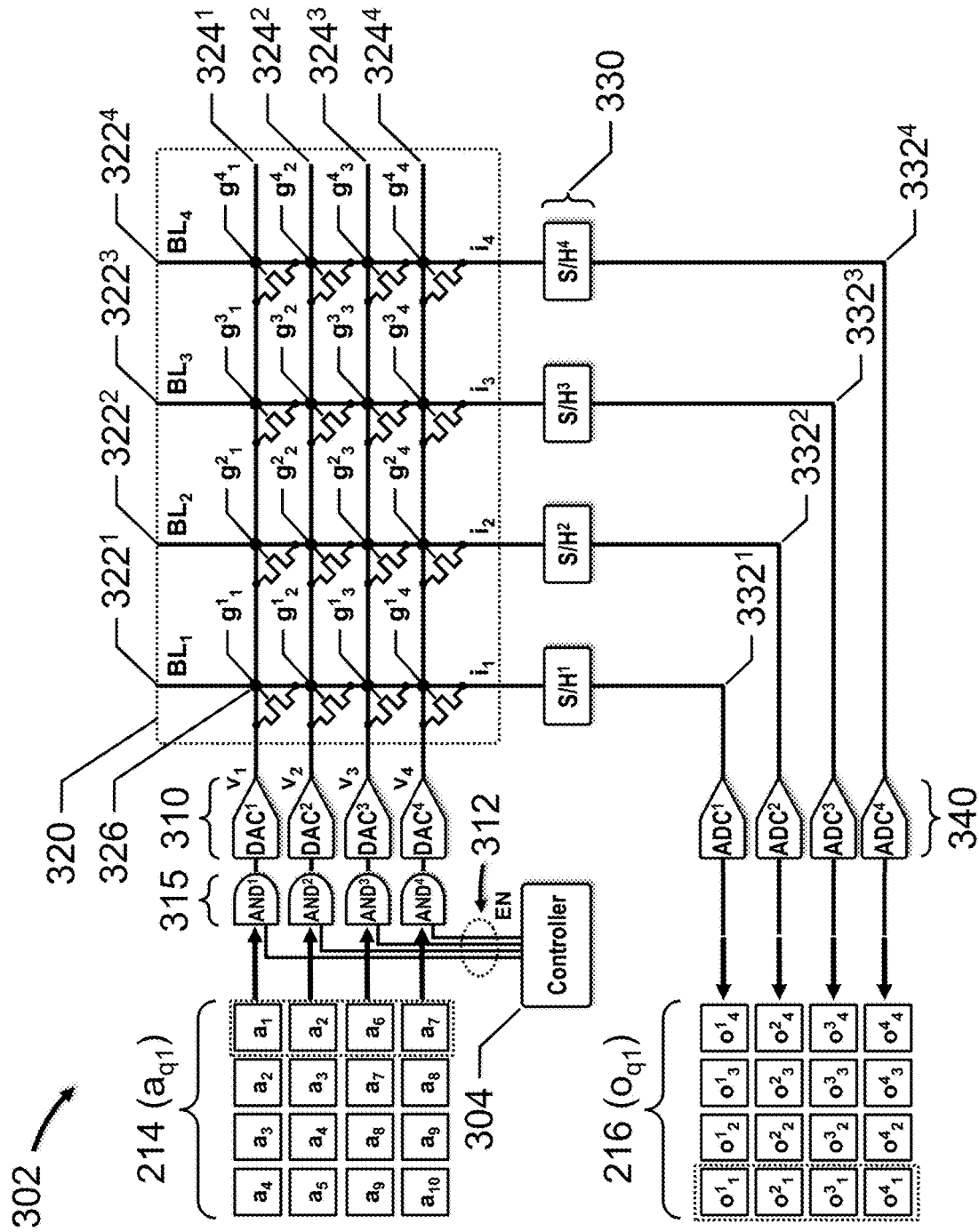
FIG. 3B depicts a CIM array module in accordance with an embodiment of the present disclosure.

FIG. 3B depicts CIM array module 302, in accordance with an embodiment of the present disclosure.

Generally, CIM array module 302 includes the same components as CIM array module 300. Advantageously, S/H circuits 330 have significantly smaller capacitors, and ADCs 340 have significantly smaller resolution. Controller 304, AND gates 315 (i.e., $AND^1$, $AND^2$, $AND^3$ and $AND^4$), and other processing circuitry (not depicted for clarity) have been added. The functionality of CIM array module 302 is described with respect to the FIG. 5E below.

Figure 4A:
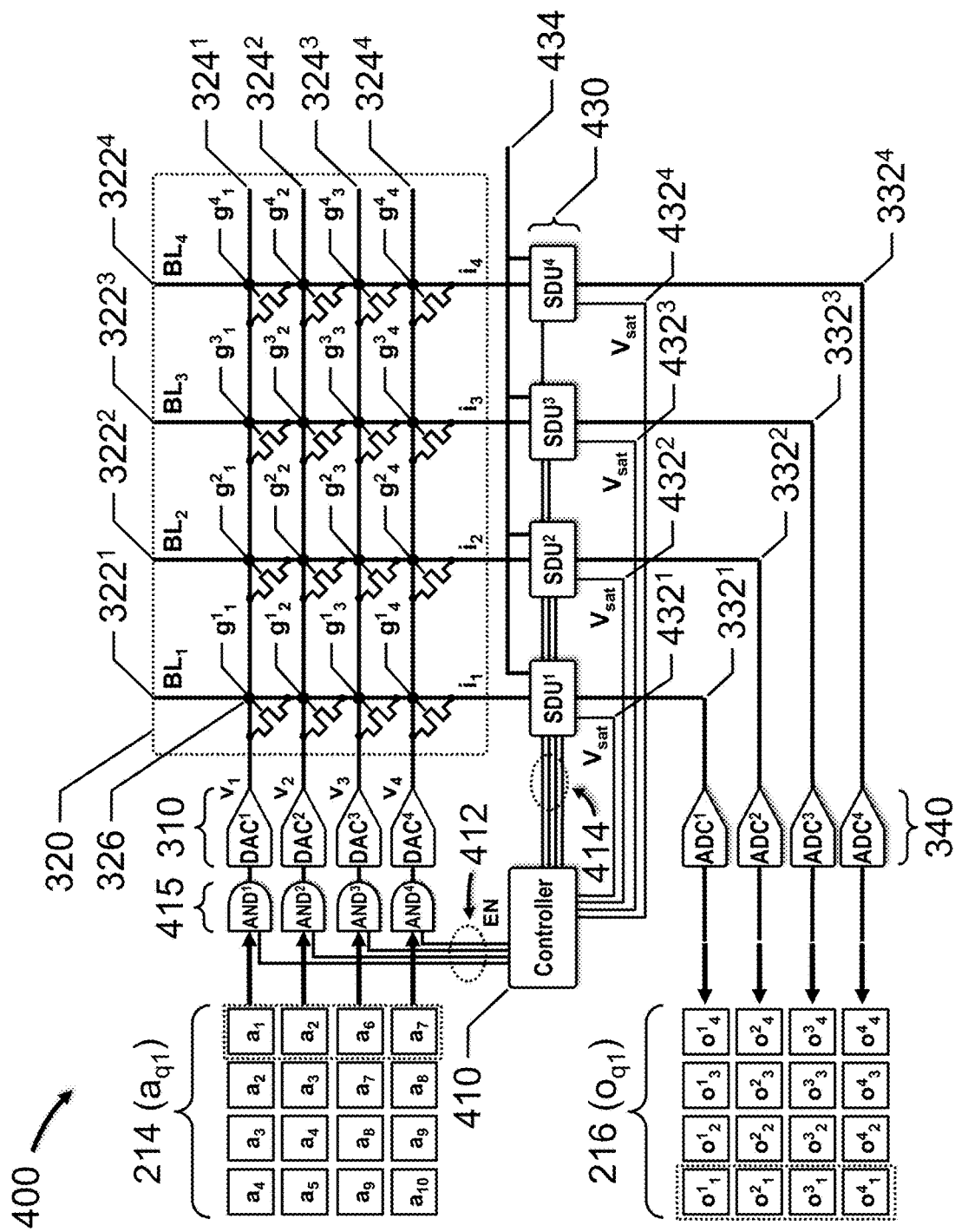
FIG. 4A depicts a CIM array module, in accordance with an embodiment of the present disclosure.

FIG. 4A depicts CIM array module 400, in accordance with an embodiment of the present disclosure.

CIM array module 400 includes signal processing circuitry and CIM array 320 that performs analog MAC operations. For example, converted convolution operation 210 may be implemented by CIM array module 400. Generally, CIM array 320 is a 4×4 array; other array sizes are also supported by the present disclosure, such as, for example, 8×8, 16×16, etc.

The signal processing circuitry for CIM array module 400 includes controller 410, AND gates 415 (i.e., $AND^1$, $AND^2$, $AND^3$ and $AND^4$), DACs 310 (i.e., $DAC^1$, $DAC^2$, $DAC^3$ and $DAC^4$), SDUs 430 (i.e., $SDU^1$, $SDU^2$, $SDU^3$ and $SDU^4$), and ADCs 340 (i.e., $ADC^1$, $ADC^2$, $ADC^3$ and $ADC^4$). As discussed above, CIM array 320 includes four bit lines (BLs) or column signal lines 322, i.e., column signal lines $322^1$, $322^2$, $322^3$ and $322^4$, four word lines (WLs) or row signal lines 324, i.e., row signal lines $324^1$, $324^2$, $324^3$ and $324^4$, and sixteen cells 326, one disposed at each intersection of column signal lines 322 and row signal lines 324. DACs 310 are coupled to row signal lines 324, SDUs 430 are coupled to column signal lines 322, and ADCs 340 are coupled to SDUs 430 via sampled signal lines 332 (i.e., sampled signal lines $332^1$, $332^2$, $332^3$ and $332^4$).

In other embodiments, SDUs 430 may be shared, and each SDU 430 may be coupled to two or more column signal lines 414 by a multiplexer that is coupled to controller 410. For example, two SDUs 430 may be coupled to CIM array 320 rather than four SDUs 430. One SDU 430, e.g., $SDU^1$, may be coupled to column signal lines $322^1$ and $322^2$, while another SDU 430, e.g., $SDU^2$, may be coupled to column signal lines $322^3$ and $322^4$. Processing is correspondingly distributed over two processing cycles, rather than a single processing cycle, using this SDU multiplexing example. In another example, one SDU 430 may be coupled to CIM array 320 rather than four SDUs 430. One SDU 430, e.g., $SDU^1$, may be coupled to column signal lines $322^1$, $322^2$, $322^3$ and $322^4$, and processing is correspondingly distributed over four processing cycles, rather than a single processing cycle, using this SDU multiplexing example. Other numbers of multiplexed SDUs 430 are also contemplated. Controller 410 provides the control signals to the multiplexers necessary to connect a particular column signal line 322 to a respective SDU 430 during each processing cycle.

Generally, DACs 310 are optional. In those embodiments that do not include DACs 310, voltage levels proportional to the input data are applied directly to AND gates 415.

Controller 410 is coupled to AND gates 415 via enable signal lines 412, and to SDUs 430 via SDU control signal lines 414 and saturation signal lines 432, i.e., saturation signal lines $432^1$, $432^2$, $432^3$ and $432^4$. During normal cycles, controller 410 transmits an enable signal to a set of AND gates 415 to provide a set of input data to DACs 310. In many embodiments, the set of AND gates 415 includes all of the AND gates 415. In other embodiments, the set of AND gates 415 may include less than all of the AND gates 415, such as, for example, 64 AND gates 415 out of a total of 256 AND gates 415.

During partial summation cycles, controller 410 transmits an enable signal to certain AND gates 415 to allow a portion of the input data to be provided to certain DACs 310, and transmits a disable signal to the remaining DACs 310 to prevent the remaining input data from being provided to the remaining DACs 310, as discussed in more detail below. In addition to sampling and outputting BL signals $BL_1$, $BL_2$, $BL_3$, and $BL_4$ over sampled signal lines $332^1$, $332^2$, $332^3$ and $332^4$ to ADCs 340, SDUs 430 also receive SDU control signals from controller 410 over SDU control signal lines 414, and a reference voltage signal, $V_{ref}$, over reference signal line 434. The reference voltage signal, $V_{ref}$, is the saturation threshold voltage. Each SDU 430 also outputs a saturation voltage signal, $V_{sat}$, over saturation signal lines 432 to controller 410.

Generally, generation of the reference voltage signal, $V_{ref}$, over reference signal line 434 is optional. In those embodiments that do not include reference signal line 434, each SDU 430 generates $V_{ref}$ internally. Additionally, in certain embodiments, SDUs 430 do not sample BL signals $BL_1$, $BL_2$, $BL_3$, and $BL_4$ but simply transmit these analog signals over sampled signal lines $332^1$, $332^2$, $332^3$ and $332^4$ to ADCs 340. In these embodiments, SDUs 430 either receive a reference current signal, $I_{ref}$, over reference signal line 434 or generate the reference current signal, $I_{ref}$, internally. SDUs 430 identify when a current of the analog signal is greater than a saturation threshold current, i.e., the reference current signal, $I_{ref}$.

For sparse matrices, a capacitor size, $C_{sat}$, may be advantageously selected that supports less than the maximum current, $i_{max}$, that may be discharged for dense matrices. For example, when converted input data matrix 214 and converted weight matrix 212 have 50% sparsity, the maximum current that may be discharged on each column signal line 322 is $i_{max}/2$, while the average current that may be discharged on each column signal line 322 is $i_{max}/4$. Selecting a capacitor size, $C_{sat}$, that supports $i_{max}/2$ may still overprovision CIM array 320 because $i_{max}/2$ will only be occasionally generated by 50% sparse matrices.

Instead, the capacitor size, $C_{sat}$, may be selected to support less than $i_{max}/2$ but more than $i_{max}/4$, which represents most of the currents that are generated by 50% sparse matrices. However, because the maximum current that may be required to be discharged on each column signal line 322 is $i_{max}/2$, an SDU 430 will saturate when presented with this situation. In other words, an SDU 430 with a capacitor size that supports a maximum current that is less than $i_{max}/2$ will not be able to discharge enough current to generate $i_{max}/2$, which, unfortunately, introduces error into the sampled signal output over sampled signal lines $332^1$, $332^2$, $332^3$ and $332^4$ to ADC 340.

The teachings of the present disclosure are applicable to other sparsity values, such as, for example, 20%, 25%, 35%, 60%, 75%, etc.

In the embodiment depicted in FIG. 4A, four elements of converted weight matrix 212 and four elements of converted input data matrix 214 are multiplied together to generate one element of converted output data matrix 216. For purposes of discussion only, the values for the voltages $v_i$ and conductances $g^i_j$ will be simplified to binary values; other values are, or course, supported by the present disclosure. In this context, the maximum voltage, $v_{max}$, and the maximum conductance, $g_{max}$, are 1.

For dense matrices with 0% sparsity, the maximum current generated by any column signal line 322 is 4, which requires an ADC resolution of 3-bits. For example, for column signal line $322^1$, $a_1=a_2=a_6=a_7=a_{max}$, $w^1_1=w^1_2=w^1_3=w^1_4=w_{max}$, $v_1=v_2=v_3=v_4=v_{max}=1$, and $g^1_1=g^1_2=g^1_3=g^1_4=g_{max}=1$. For matrices with 50% sparsity, the maximum current generated by any column signal line 322 is 2, which requires an ADC resolution of 2-bits. For example, for column signal line $322^1$, $a_1=a_2=a_{max}$ and $a_6=a_7=0$, $w^1_1=w^1_2=w_{max}=1$ and $w^1_3=w^1_4=0$, $v_1=v_2=v_{max}=1$ and $v_3=v_4=0$, and $g^1_1=g^1_2=g_{max}=1$ and $g^1_3=g^1_4=0$. As discussed above, because the maximum current value of 2 is only occasionally generated, the capacitor size, $C_{sat}$, may be selected to support a current value of 1 (as well as 0), which represents most of the currents that are generated by this example. In certain embodiments, a 1-bit resolution ADC may be used, such as, for example, an inverter or a sense amplifier.

In one embodiment, the value of the capacitor size, $C_{sat}$, may be selected to support a current of $i_{max}/3$, i.e., ⅔, which less than $i_{max}/2$ but more than $i_{max}/4$. In terms of n, i.e., the number of cells 236 per column signal line 322, $C_{sat}$ may be selected to support n/3, i.e., ⅔. In other words, the capacitor size, $C_{sat}$, supports current values of 1 and 0, but does not support the maximum current value of 2 which will saturate SDUs 430, e.g., SDU $430^1$. Advantageously, the resolution of ADCs 340, e.g., $ADC^1$, may be reduced to 1 bit.

In order to properly determine a saturated current value of 2, SDUs 430, e.g., SDU $430^1$, output a saturation signal along saturation signal lines 432, e.g., saturation signal line $432^1$, to controller 410 during a normal cycle. The saturation signal indicates that the dot product calculation on a particular column signal line 322, e.g., column signal line $322^1$, must be performed again by apportioning the dot product calculation into two partial summation cycles, each of which calculates 50% of the dot product. For this example, the first partial summation cycle calculates the dot product between $a_1 \cdot w^1_1 = v_1 \cdot g^1_1 = v_{max} \cdot g_{max} = 1 \cdot 1 = 1$, while the second partial summation cycle calculates the dot product between $a_2 \cdot w^1_2 = v_2 \cdot g^1_2 = v_{max} \cdot g_{max} = 1 \cdot 1 = 1$. The two dot products are then digitally combined, downstream of ADC $340^1$, to generate the correct value of 2, and the next normal cycle then commences.

More particularly, when controller 410 receives a saturation signal from an SDU 430, e.g., SDU $430^1$, controller 410 determines which row signal lines 324 received the $v_{max}$ signals based on the input data to DACs 310. During the first partial summation cycle, controller 410 transmits a disable signal to the AND gates 315 for the remaining DACs 310, e.g., $DAC^2$, $DAC^3$ and $DAC^4$, and the dot product for the first row signal line 324, e.g., row signal line $324^1$, is determined, i.e., 1. During the second partial summation cycle, controller 410 transmits a disable signal to the AND gate 315 for the first DAC 310, e.g., $DAC^1$, and transmits an enable signal to the AND gate 315 for the second DAC 310, e.g., DAC², and the dot product for the second row signal line 324, e.g., row signal line 324², is determined, i.e., 1. Generally, during each partial summation cycle, controller 410 transmits either an enable signal or a disable signal to each AND gate 415 to explicitly set the state of each AND gate 415.

Figure 5A:
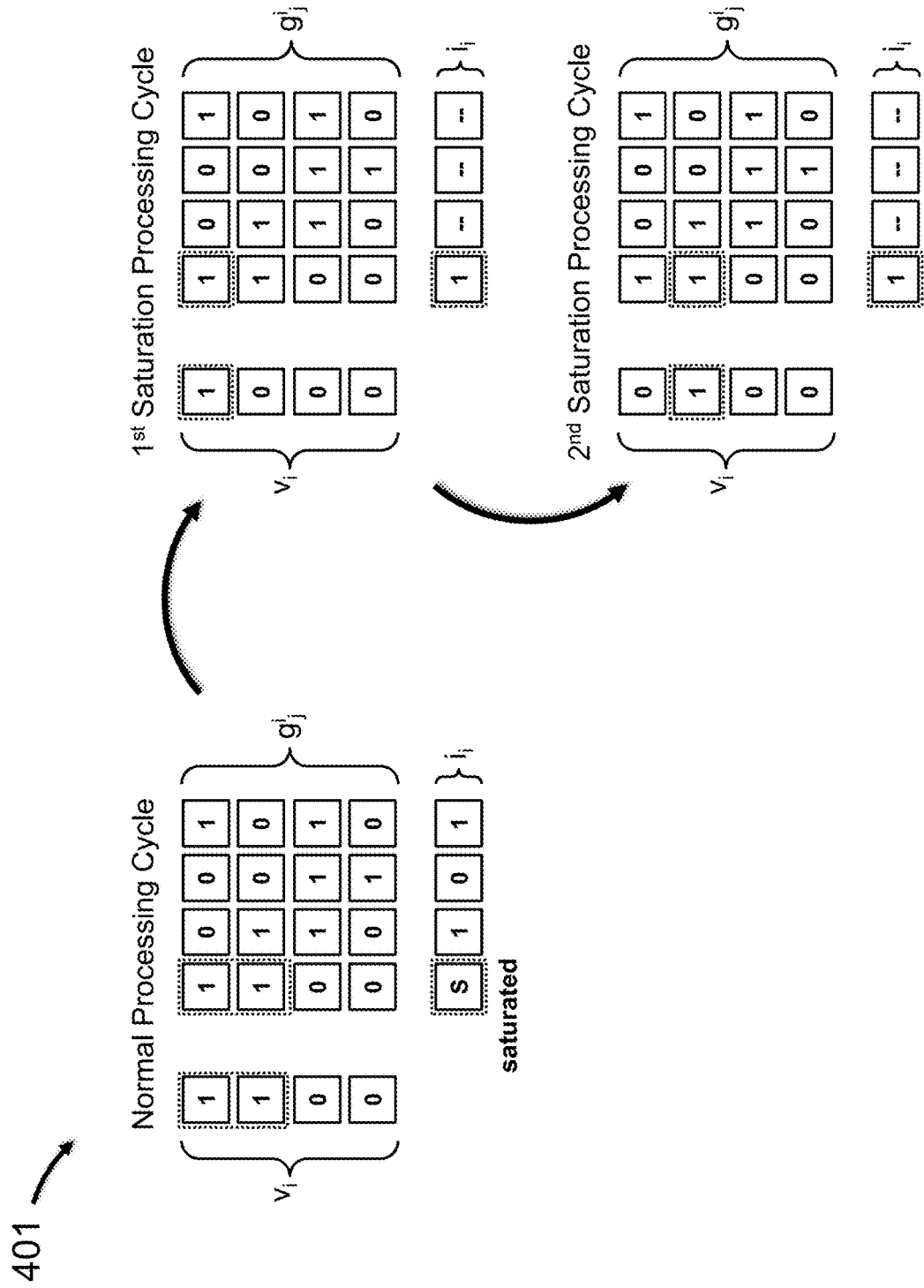
FIG. 5A depicts a data flow diagram for a CIM array module, in accordance with an embodiment of the present disclosure.

FIG. 5A depicts data flow diagram 401 for CIM array module 400, in accordance with an embodiment of the present disclosure. Data flow diagram illustrates the example described above when controller 410 receives a saturation signal from an SDU 430, e.g., SDU 430¹. Example voltage values, $v_i$, conductances values $g^i_j$, and current values $i_i$ are depicted for the normal cycle, the first partial summation cycle and the second partial summation cycle.

Referring back to FIG. 4A, in another example, controller 410 receives saturation signals from two SDUs 430, e.g., SDU¹ and SDU⁴. Controller 410 then determines which row signal lines 324 received the $v_{max}$ signals based on the input data to DACs 310. For this example, for column signal line 322¹, the first partial summation cycle calculates the dot product between $a_1 \cdot w^1_1 = v_1 \cdot g^1_1 = v_{max} \cdot g_{max} = 1 \cdot 1 = 1$, while the second partial summation cycle calculates the dot product between $a_2 \cdot w^1_2 = v_2 \cdot g^1_2 = v_{max} \cdot g_{max} = 1 \cdot 1 = 1$. Similarly, for column signal line 322⁴, the first partial summation cycle calculates the dot product between $a_1 \cdot w^4_1 = v_1 \cdot g^4_1 = v_{max} \cdot g_{max} = 1 \cdot 1 = 1$, while the second partial summation cycle calculates the dot product between $a_2 \cdot w^4_2 = v_2 \cdot g^4_2 = v_{max} \cdot g_{max} = 1 \cdot 1 = 1$.

During the first partial summation cycle, controller 410 transmits a disable signal to the AND gates 315 for the remaining DACs 310, e.g., DAC², DAC³ and DAC⁴, and the dot products for the first row signal lines 324, e.g., row signal line 324¹, are determined, i.e., 1. During the second partial summation cycle, controller 410 transmits a disable signal to the AND gate 315 for the first DAC 310, e.g., DAC¹, and transmits an enable signal to the AND gate 315 for the fourth DAC 310, e.g., DAC⁴, and the dot products for the fourth row signal line 324, e.g., row signal line 324⁴, are determined, i.e., 1.

Figure 5B:
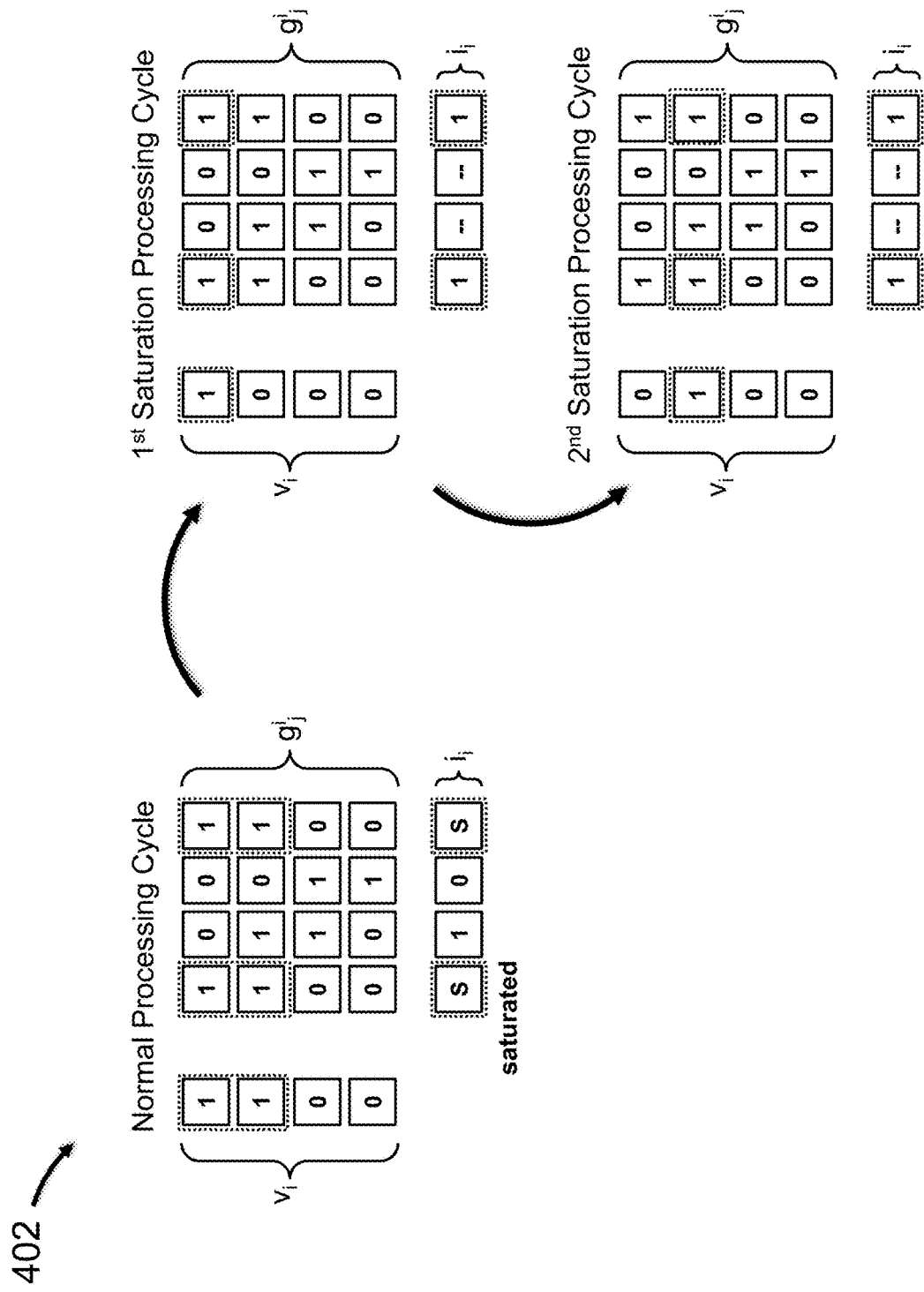
FIG. 5B depicts a data flow diagram for a CIM array module, in accordance with an embodiment of the present disclosure.

FIG. 5B depicts data flow diagram 402 for CIM array module 400, in accordance with an embodiment of the present disclosure. Data flow diagram illustrates the example described above when controller 410 receives saturation signals from two SDUs 430, e.g., SDU 430¹ and SDU 430⁴. Example voltage values, $v_i$, conductances values $g^i_j$, and current values $i_1$ are depicted for the normal processing cycle, the first partial summation cycle and the second partial summation cycle.

In another embodiment, CIM array 320 is an 8×8 array. In this embodiment, eight elements of a weight matrix and eight elements of an input data matrix are multiplied together to generate one element of a converted output matrix. Again, for purposes of discussion only, the values for the voltages vi and conductances $g^i_j$ will be simplified to binary values; other values are, or course, supported by the present disclosure. In this context, the maximum voltage, $v_{max}$, and the maximum conductance, $g_{max}$, are 1.

For dense matrices with 0% sparsity, the maximum current generated by any column signal line 322 is 8, which requires an ADC resolution of 4-bits. For matrices with 50% sparsity, the maximum current generated by any column signal line 322 is 4, which requires an ADC resolution of 3-bits. As discussed above, because the maximum current value of 4 is only occasionally generated, the capacitor size, $C_{sa}t$, may be selected to support a current value of 3 (as well as 2, 1 and 0), which represents most of the currents that are generated by this embodiment.

As described above, the value of the capacitor size, $C_{sat}$, may be selected to support a current of $i_{max}/3$, i.e., ⅔, which less than $i_{max}/2$ but more than $i_{max}/4$. In terms of n, i.e., the number of cells 236 per column signal line 322, $C_{sat}$ may be selected to support n/3, i.e., ⅔. In another embodiment, the value of the capacitor size, $C_{sat}$, may be selected to support a current of $1.2 \cdot i_{max}/3$, which less than $i_{max}/2$ but more than $i_{max}/4$. In other words, the capacitor size, $C_{sat}$, supports current values of 3, 2, 1 and 0, but does not support the maximum current value of 4 which will saturate SDUs 430. Advantageously, the resolution of ADCs 340 may be reduced to 2 bits.

Figure 5C:
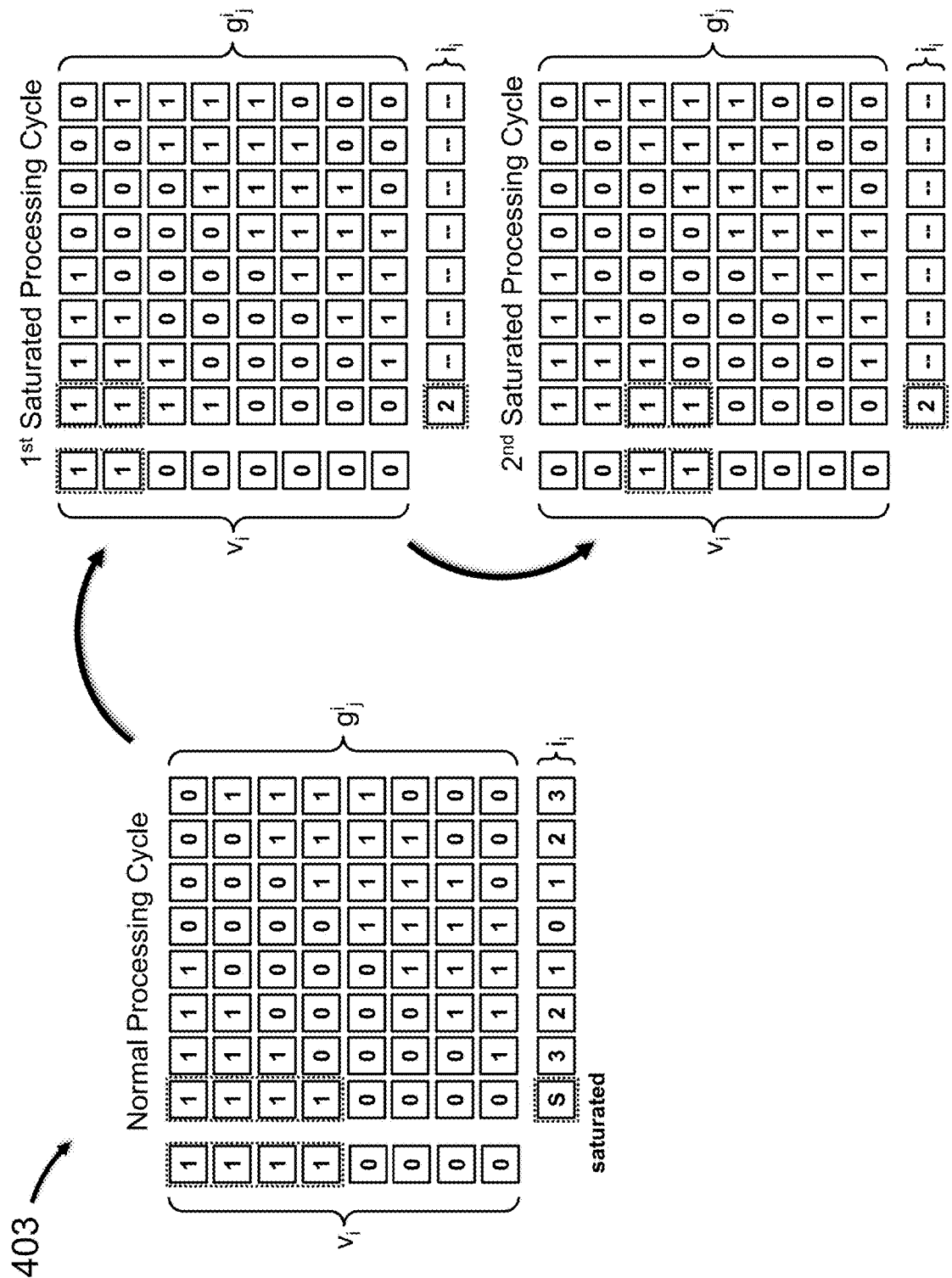
FIG. 5C depicts a data flow diagram for a CIM array with an 8×8 array, in accordance with an embodiment of the present disclosure.

FIG. 5C depicts data flow diagram 403 for a CIM array with an 8×8 array, in accordance with an embodiment of the present disclosure. Data flow diagram 403 illustrates the example described above when controller 410 receives a saturation signal from a single SDU 430. Example voltage values, $v_i$, conductances values $g^i_j$, and current values $i_i$ are depicted for the normal processing cycle, the first partial summation cycle and the second partial summation cycle.

Figure 5D:
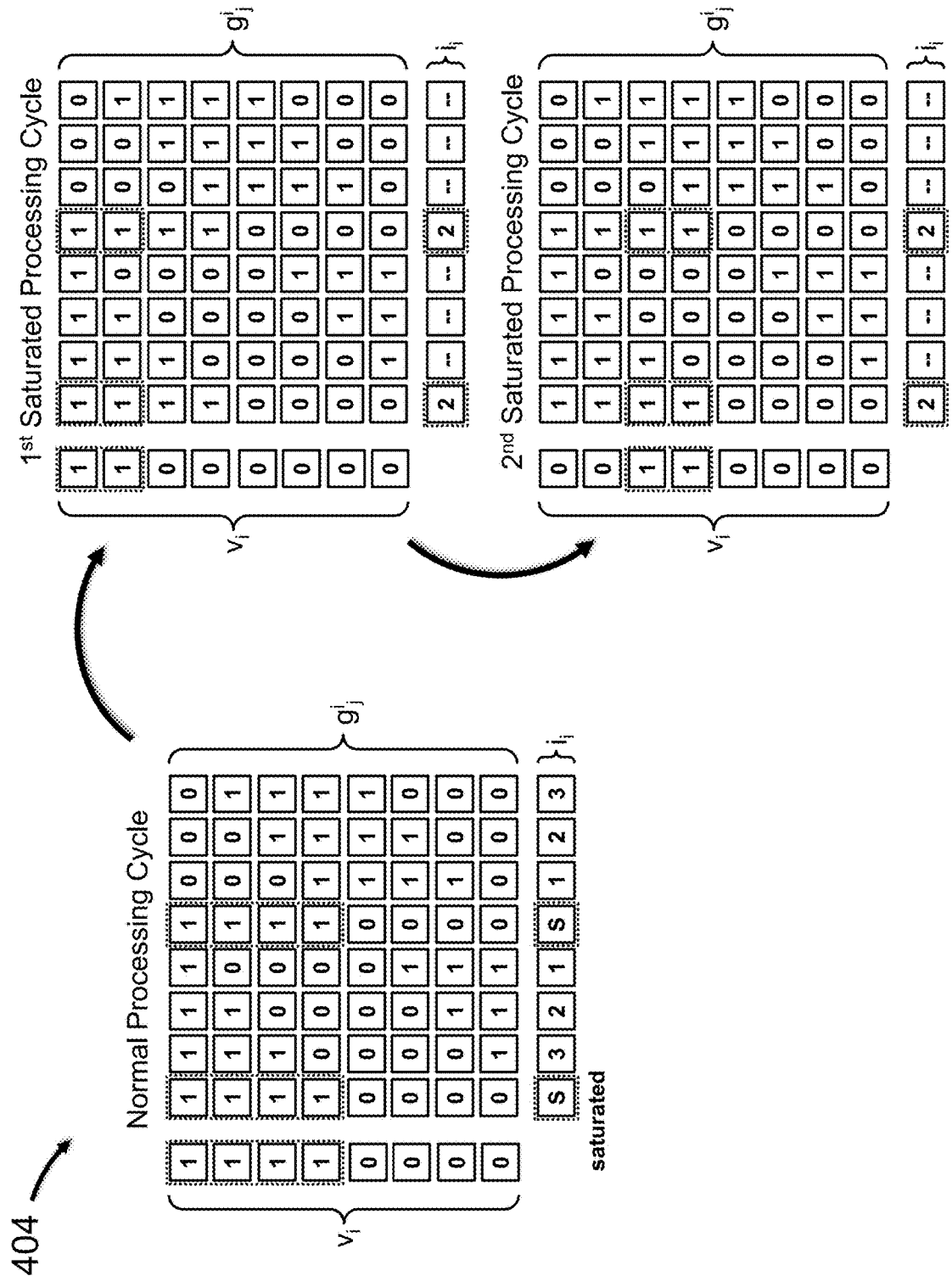
FIG. 5D depicts a data flow diagram for a CIM array with an 8×8 array, in accordance with an embodiment of the present disclosure.

FIG. 5D depicts data flow diagram 404 for CIM array module with an 8×8 array, in accordance with an embodiment of the present disclosure. Data flow diagram illustrates the example described above when controller 410 receives saturation signals from two SDUs 430. Example voltage values, vi, conductances values $g^i_j$, and current values $i_i$ are depicted for the normal processing cycle, the first partial summation cycle and the second partial summation cycle.

Figure 5E:
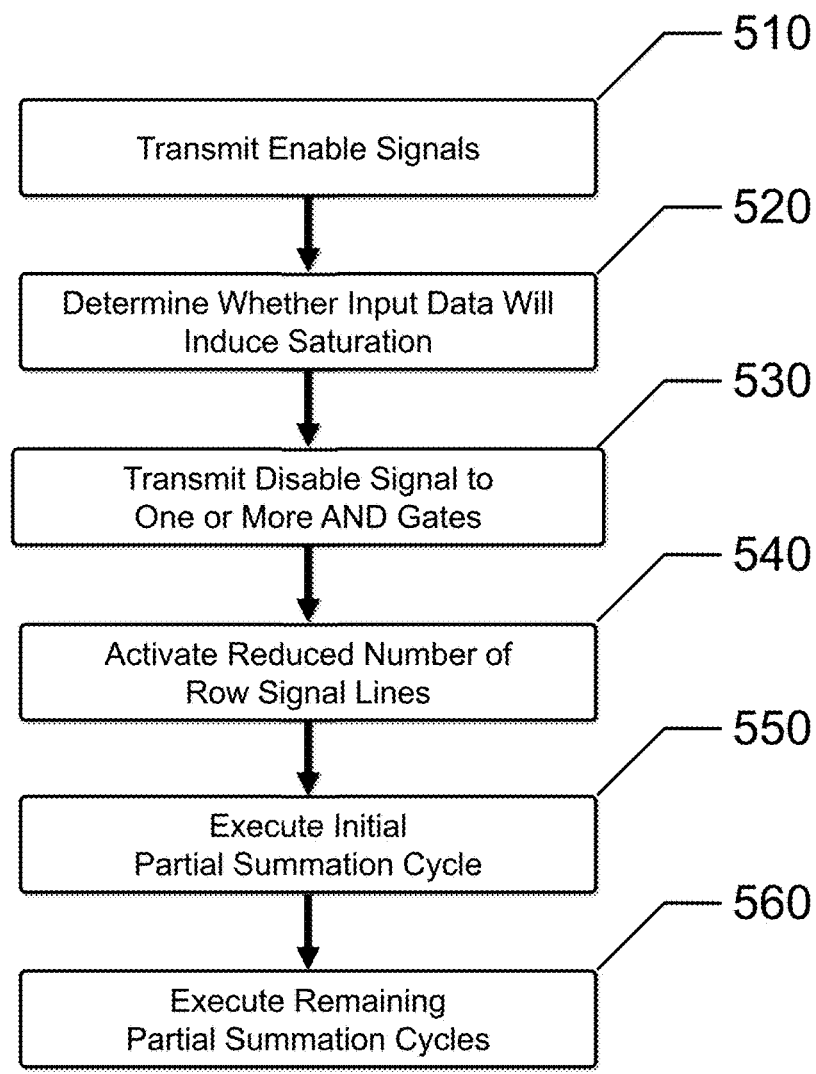
FIG. 5E depicts a flow diagram for a CIM array module, in accordance with an embodiment of the present disclosure.

FIG. 5E depicts data flow diagram 406 for CIM array module 302, in accordance with an embodiment of the present disclosure.

Generally, with respect to CIM array module 302, the processing circuitry detects the number of ones in the input vector, and, if the number of ones in the input data will induce saturation, the processing circuitry divides the processing cycle into multiple partial summation cycles based on a maximum number of ones allowed in each partial summation cycle, similar to the methods described above. Controller 304 transmits enable and disable signals to AND gates 315 based on the specific requirements of each partial summation cycle.

At 510, controller 304 transmits enable signals, via enable signal lines 312, to AND gates 315. At 520, the processing circuitry determines whether the input data will induce saturation by "activating" a number of row signal lines 324 that exceeds a predetermined number of allowable row signal lines 324. When the processing circuitry determines that saturation will be induced, flow proceeds to 530. At 530, controller 304 transmits a disable signal to one of more AND gates 315, and flow proceeds to 540. At 540, a reduced number of row signal lines 324 are activated, and the initial partial summation cycle begins at 550. The reduced number of row signal lines 324 that are activated may be a fraction, such as, for example, ½, ¼, etc., a percentage, etc. The remaining partial summation cycles are then executed at 560.

Figure 6A:
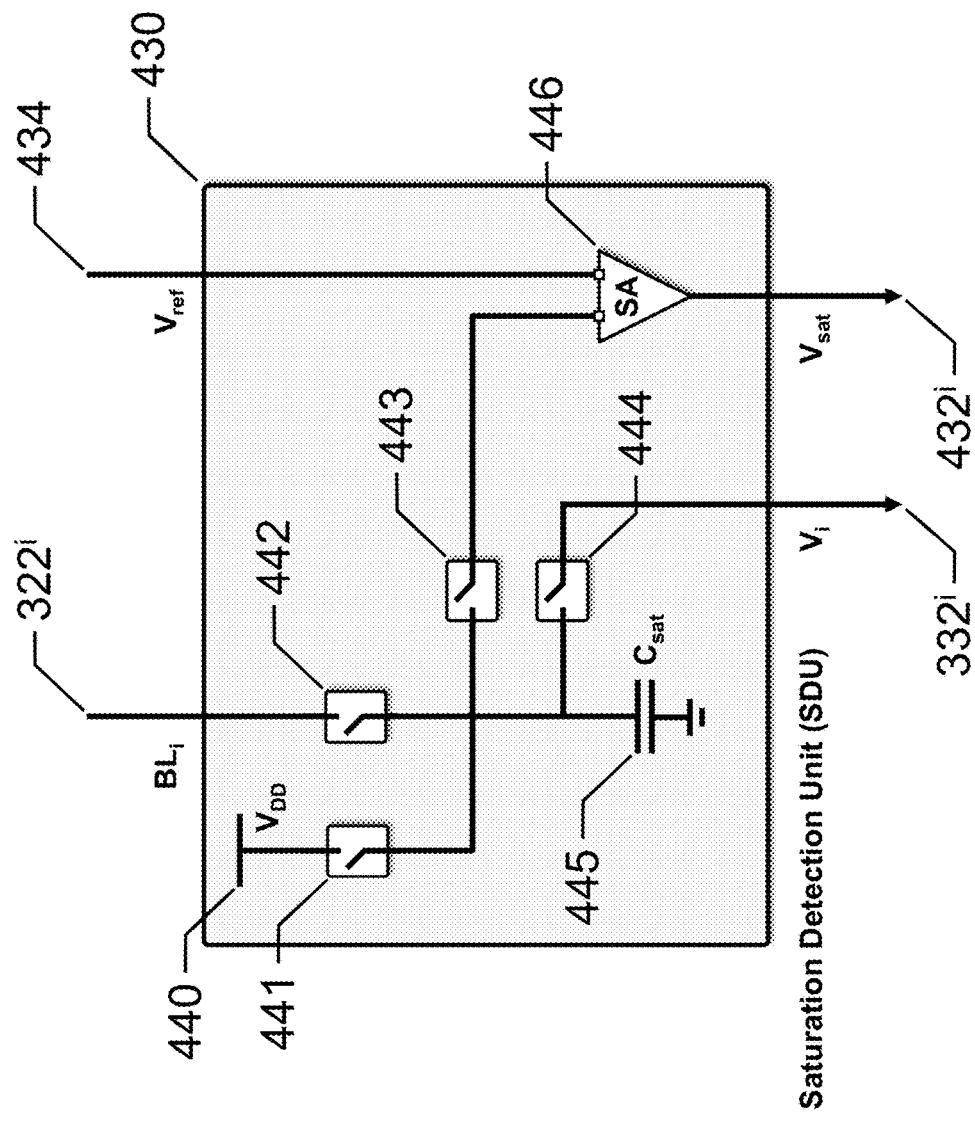
FIG. 6A depicts a block diagram of a saturation detection unit (SDU), in accordance with an embodiment of the present disclosure.

FIG. 6A depicts a block diagram of SDU 430, in accordance with an embodiment of the present disclosure.

SDU 430 includes switches 441, 442, 443 and 444, capacitor 445 and differential amplifier or comparator 446. Capacitor 445 has a size of $C_{sat}$, as discussed above. The input of switch 441 is coupled to voltage rail 440, which supplies $V_{dd}$. The input of switch 442 is coupled to one of the column signal lines 322, i.e., column signal line 322ⁱ. Capacitor 445 is coupled to the outputs of switches 441 and 442, and to the inputs of switches 443 and 444. Comparator 446 has a first input, a second input and an output. The first input is coupled to the output of switch 443, the second input is coupled to reference signal line 434, and the output is coupled to one of the saturation signal lines 432, i.e., saturation signal line $432^i$. The inputs of switches 443 and 444 are coupled to the output of switch 442 and capacitor 445, the output of switch 443 is coupled to the first input of comparator 446, and the output of switch 444 is coupled to one of the sampled signal lines 332, i.e., sampled signal lines $332^i$.

In other words, capacitor 445 is selectively coupled to a respective column signal line $322^i$ and a respective sampled signal line 332', and comparator 446 is selectively coupled to a respective column signal line $322^i$ and coupled to reference signal line 434 and a respective saturation signal line $432^i$.

SDU 430 has two operating phases that are controlled by controller 410, i.e., a pre-charge phase and a sample phase. During the pre-charge phase, switches 442, 443 and 444 are open, and switch 441 is closed which connects capacitor 445 to voltage rail 440 to pre-charge capacitor 445 to $V_{dd}$. During the sample phase, switch 441 is open, and switches 442, 443 and 444 are closed which couples column signal line 322 to capacitor 445 to function as a current source because $V_{dd}$ is greater than $v_{max}$, couples column signal line $322^i$ to sampled signal line $332^i$ to provide a voltage level for one of the ADCs 340, i.e., ADC $340^i$, and couples column signal line $322^i$ to the first input of comparator 446 to provide a voltage level for comparison to the reference voltage signal $V_{ref}$ in order to detect saturation. The use of the terms input and output with respect to switch 442 is a matter of convenience and does not necessarily indicate the direction of current flow.

During the sample phase, the voltage level provided to sampled signal line 332' starts at $V_{dd}$ and decreases therefrom. Because the discharge current from capacitor 445 is equal to $C_{sat} \cdot dV_i/dt$, i.e., the capacitance multiplied by the change in voltage over time, ADC $340^i$ simply measures the time, $t_{ADC}$, for the voltage level $V_i$ on sampled signal line $332^i$ to decrease from $V_{dd}$ to a threshold voltage, $V_{threshold}$, which is greater than $v_{max}$. Accordingly, the speed or rate at which capacitor 445 is discharged, as determined by $ADC^i$, is directly related to the amount of current generated by the dot product calculation for column signal line $322^i$.

To detect saturation during the sample phase, the voltage level provided to sampled signal line $332^i$ is also provided to the first input of comparator 446, which compares this voltage to the voltage level of the reference voltage signal $V_{ref}$, which is the saturation threshold voltage. The reference voltage signal $V_{ref}$ begins at $V_{dd}$ and decreases at a rate that represents the maximum current that is supported by the capacitor size, $C_{sat}$. Accordingly, when the voltage level V, on sampled signal line 332' decreases at a rate that is slower than the reference voltage signal $V_{ref}$, then the amount of current generated by the dot product calculation for column signal line $322^i$ is supported and no saturation is present. Conversely, when the voltage level V, on sampled signal line $332^i$ decreases at a rate that is faster than the reference voltage signal $V_{ref}$, then the amount of current generated by the dot product calculation for column signal line $322^i$ is not supported and saturation is present. In other words, the reference voltage signal $V_{ref}$ has a voltage level that indicates a saturation threshold of the capacitor.

In this embodiment, the reference voltage signal $V_{ref}$ is provided over reference signal line 434. In other embodiments, the reference voltage signal $V_{ref}$ may be generated internally by SDUs 430. In certain embodiments, SDUs 430 may detect saturation by comparing the current of analog signals $BL_1$, $BL_2$, $BL_3$, and $BL_4$ to a reference current signal $I_{ref}$, which may be provided over reference signal line 434 or generated internally by SDUs 430, as discussed above.

Figure 4B:
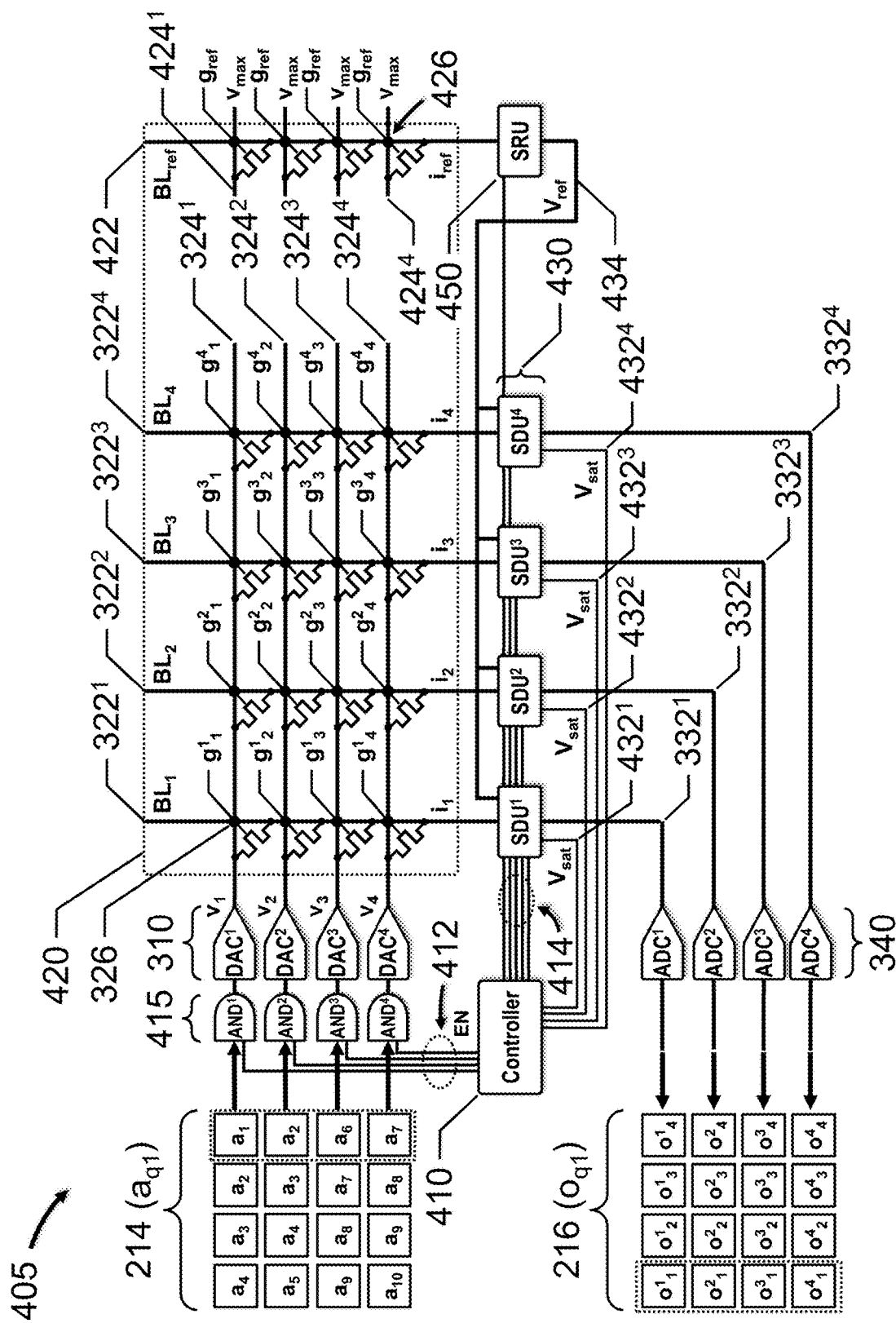
FIG. 4B depicts a CIM array module, in accordance with another embodiment of the present disclosure.

FIG. 4B depicts CIM array module 405, in accordance with another embodiment of the present disclosure.

CIM array module 405 includes signal processing circuitry and CIM array 420 that performs analog MAC operations. For example, converted convolution operation 210 may be implemented by CIM array module 400. Generally, CIM array 420 is a 4×4 array; other array sizes are also supported by the present disclosure, such as, for example, 8×8, 16×16, etc.

The signal processing circuitry for CIM array module 405 includes controller 410, AND gates 415 (i.e., $AND^1$, $AND^2$, $AND^3$ and $AND^4$), DACs 310 (i.e., $DAC^1$, $DAC^2$, $DAC^3$ and $DAC^4$), SDUs 430 (i.e., $SDU^1$, $SDU^2$, $SDU^3$ and $SDU^4$), SRU 450, and ADCs 340 (i.e., $ADC^1$, $ADC^2$, $ADC^3$ and $ADC^4$). CIM array 420 includes four bit lines (BLs) or column signal lines 322, i.e., column signal lines $322^1$, $322^2$, $322^3$ and $322^4$, four word lines (WLs) or row signal lines 324, i.e., row signal lines $324^1$, $324^2$, $324^3$ and $324^4$, sixteen cells 326, one disposed at each intersection of column signal lines 322 and row signal lines 324, a reference column signal line 422, four reference row signal lines 424, i.e., reference row signal lines $424^1$, ..., $424^4$, and four reference cells 426 disposed at each intersection of reference column signal line 422 and reference row signal lines 424. DACs 310 are coupled to row signal lines 324, SDUs 430 are coupled to column signal lines 322, SRU 450 is coupled to reference column signal line 422, and ADCs 340 are coupled to SDUs 430 via sampled signal lines 332 (i.e., sampled signal lines $332^1$, $332^2$, $332^3$ and $332^4$). In other embodiments, SDUs 430 may be shared, as discussed above.

Controller 410 is coupled to AND gates 415 via enable signal lines 412, and to SDUs 430 via SDU control signal lines 414 and saturation signal lines 432, i.e., saturation signal lines $432^1$, $432^2$, $432^3$ and $432^4$, and to SRU 450 via SDU control signal lines 414. During normal processing cycles, controller 410 transmits a close switch control signal to each AND gate 415 to provide all of the input data to DACs 310. During partial summation cycles, controller 410 transmits a close switch control signal to certain AND gates 415 to allow a portion of the input data to be provided to certain DACs 310, and transmits an open switch control signal to the remaining DACs 310 to prevent the remaining input data from being provided to the remaining DACs 310, as discussed above. In addition to sampling and outputting BL signals $BL_1$, $BL_2$, $BL_3$, and $BL_4$ over sampled signal lines $332^1$, $332^2$, $332^3$ and $332^4$ to ADCs 340, SDUs 430 also receive control signals from controller 410 over SDU control signal lines 414, and a reference voltage signal, $V_{ref}$, over reference signal line 434, that is generated by SRU 450. Each SDU 430 also outputs a saturation voltage signal, $V_{sat}$, over saturation signal lines 432 to controller 410.

In one embodiment, a voltage of $v_{max}$ is provided to reference row signal lines $424^1$, ..., $424^4$, and the conductance value $g_{ref}$ at each cell 326 is selected so that these four elements generate the maximum current that is supported by the capacitor size, $C_{sat}$. In another embodiment, a voltage of $v_{max}$ is provided to reference row signal lines $424^1$, ..., $424^4$, a number of reference cells 426 are programmed with a conductance value of $g_{max}$, and the remaining reference cells 426 are programmed with a conductance value of 0 to generate the maximum current that is supported by the capacitor size, $C_{sat}$. For the 50% sparsity example discussed above, 2 reference cells 426 are programmed with a conductance value of $g_{max}$, and 2 reference cells 426 are programmed with a conductance value of 0.

Generally, the operation of CIM array module 405 is the same as CIM array module 400, with the addition of the in situ generation of the reference voltage signal, $V_{ref}$.

Figure 6B:
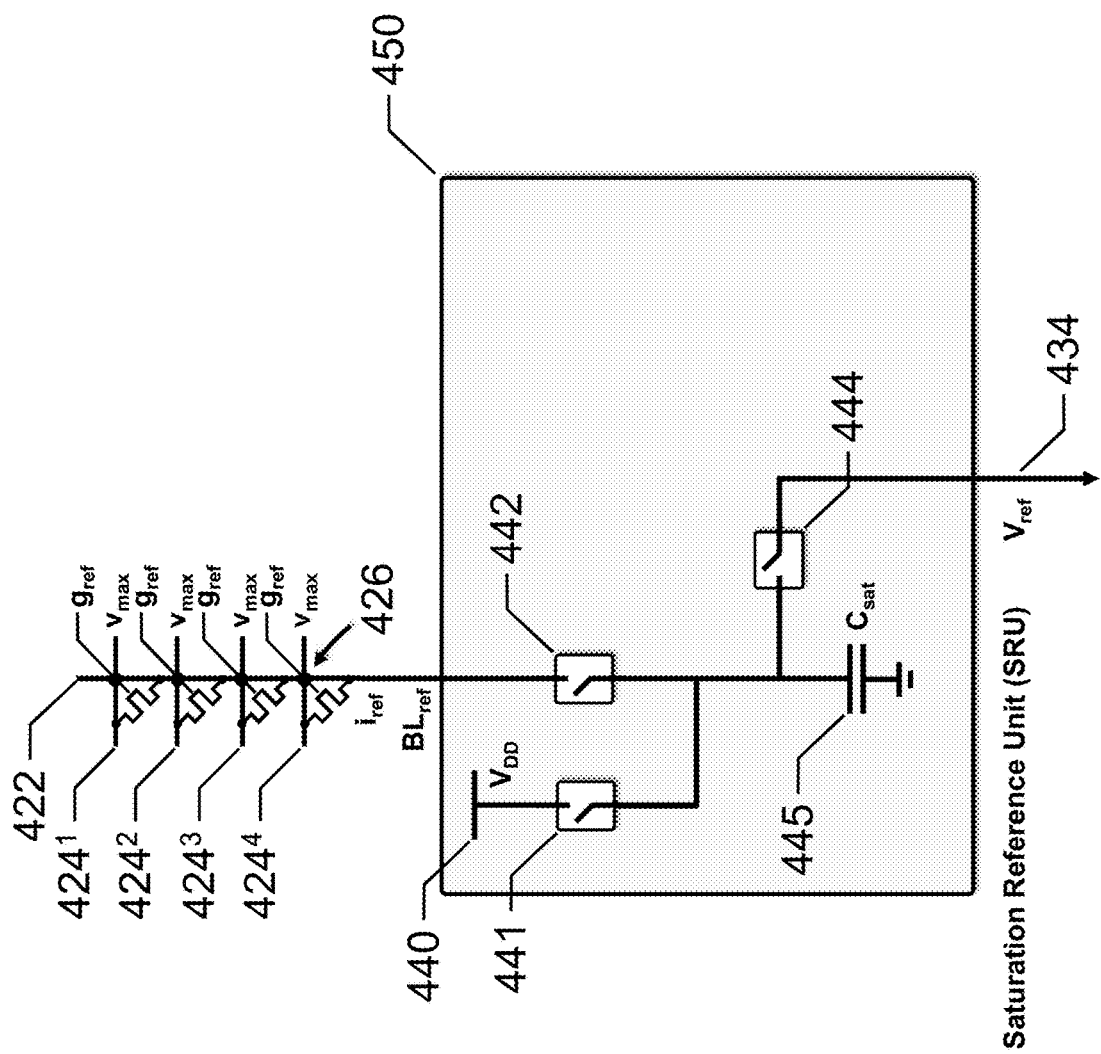
FIG. 6B depicts a block diagram of a saturation reference unit (SRU), in accordance with an embodiment of the present disclosure.

FIG. 6B depicts a block diagram of SRU 450, in accordance with an embodiment of the present disclosure.

SRU 450 includes switches 441, 442 and 444, and capacitor 445. In one embodiment, capacitor 445 has a size of $C_{sat}$, as discussed above. The input of switch 441 is coupled to voltage rail 440, which supplies $V_{dd}$. The input of switch 442 is coupled to reference column signal line 422. Capacitor 445 is coupled to the outputs of switches 441 and 442, and to the input of switch 444. The input of switch 444 is coupled to the outputs of switches 441 and 442 and capacitor 445, while the output of switch 444 is coupled to reference signal line 434.

SRU 450 has two operating phases that are controlled by controller 410, i.e., a pre-charge phase and a sample phase. During the pre-charge phase, switches 442 and 444 are open, and switch 441 is closed which connects capacitor 445 to voltage rail 440 to pre-charge capacitor 445 to $V_{dd}$. During the sample phase, switch 441 is open, and switches 442 and 444 are closed which couples reference column signal line 422 to capacitor 445 to function as a current source, and couples reference column signal line 422 to reference signal line 434 to provide the reference voltage signal $V_{ref}$ to the SDUs 430.

During the sample phase, the voltage level provided to reference signal line 434 starts at $V_{dd}$ and decreases therefrom. Because the conductance value $g_{ref}$ at each cell 326 is selected so that these four elements generate the maximum current that is supported by the capacitor size, $C_{sat}$, the reference voltage signal $V_{ref}$ is generated in situ.

Figure 7:
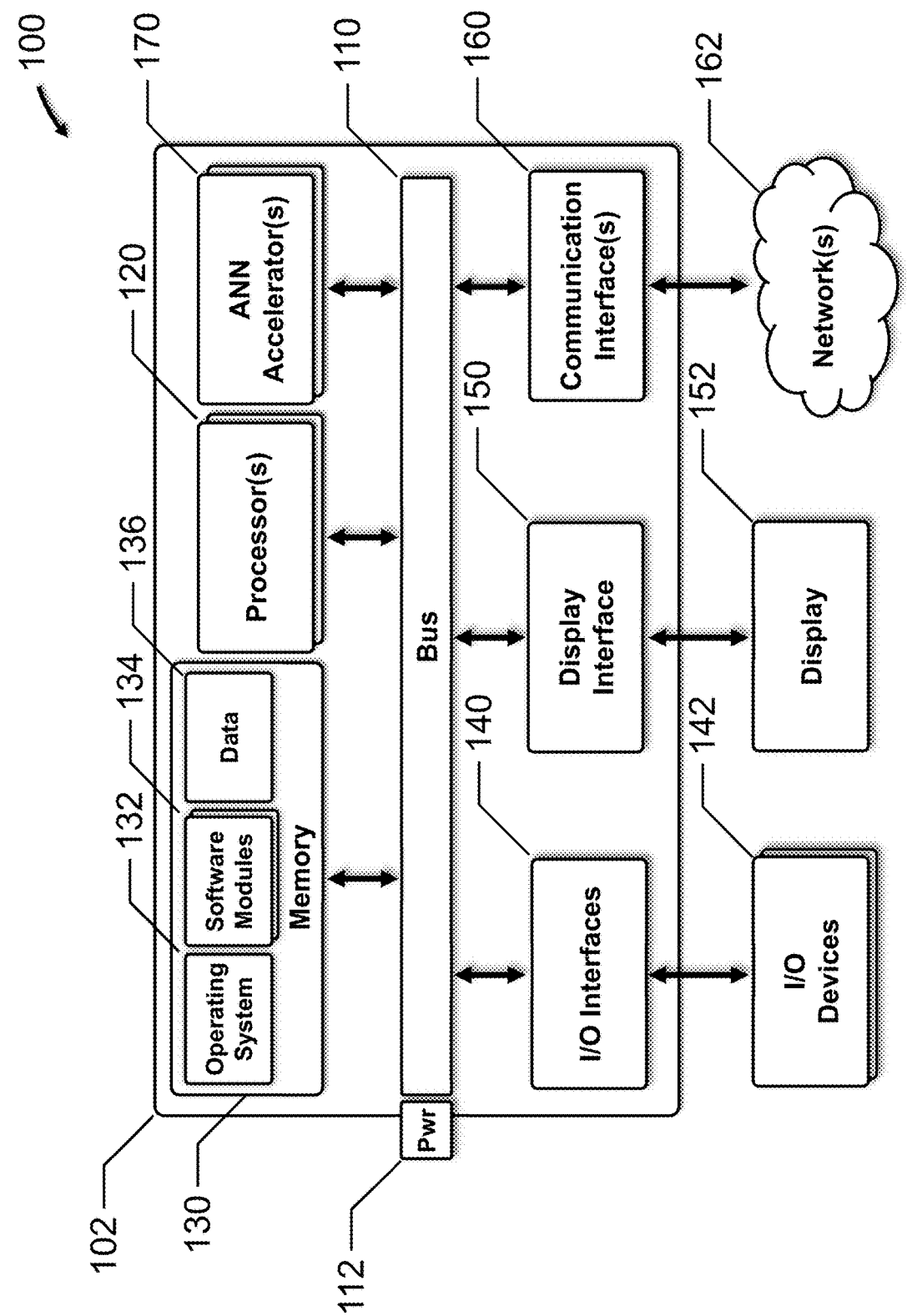
FIG. 7 depicts a block diagram of a system, in accordance with an embodiment of the present disclosure.

FIG. 7 depicts a block diagram of system 100, in accordance with an embodiment of the present disclosure.

Computer 102 includes communication bus 110 coupled to one or more processors 120, memory 130, I/O interfaces 140, display interface 150, one or more communication interfaces 160 and one or more ANN accelerators 170. Generally, I/O interfaces 140 are coupled to I/O devices 142 using a wired or wireless connection, display interface 150 is coupled to display 152, and communication interface 160 is connected to network 162 using a wired or wireless connection.

Communication bus 110 is a communication system that transfers data between processor 120, memory 130, I/O interfaces 140, display interface 150, communication interface 160, ANN accelerator 170, as well as other components not depicted. Power connector 112 is coupled to communication bus 110 and a power supply (not shown).

Processor 120 includes one or more general-purpose or application-specific microprocessors that executes instructions to perform control, computation, input/output, etc. functions for computer 102. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, software modules 134, etc., stored within memory 130. For example, software modules 134 may include an ML application, an ANN application, a CNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of RAM, DRAM, SRAM, read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 102. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 102 and/or output from computer 102. As discussed above, I/O devices 142 are operably connected to computer 102 using a wired and/or wireless connection. I/O devices 142 may include a local processor coupled to a communication interface that is configured to communicate with computer 102 using the wired and/or wireless connection. For example, I/O devices 142 may include a keyboard, mouse, touch pad, joystick, etc.

Display interface 150 is configured to transmit image data from computer 102 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 8:
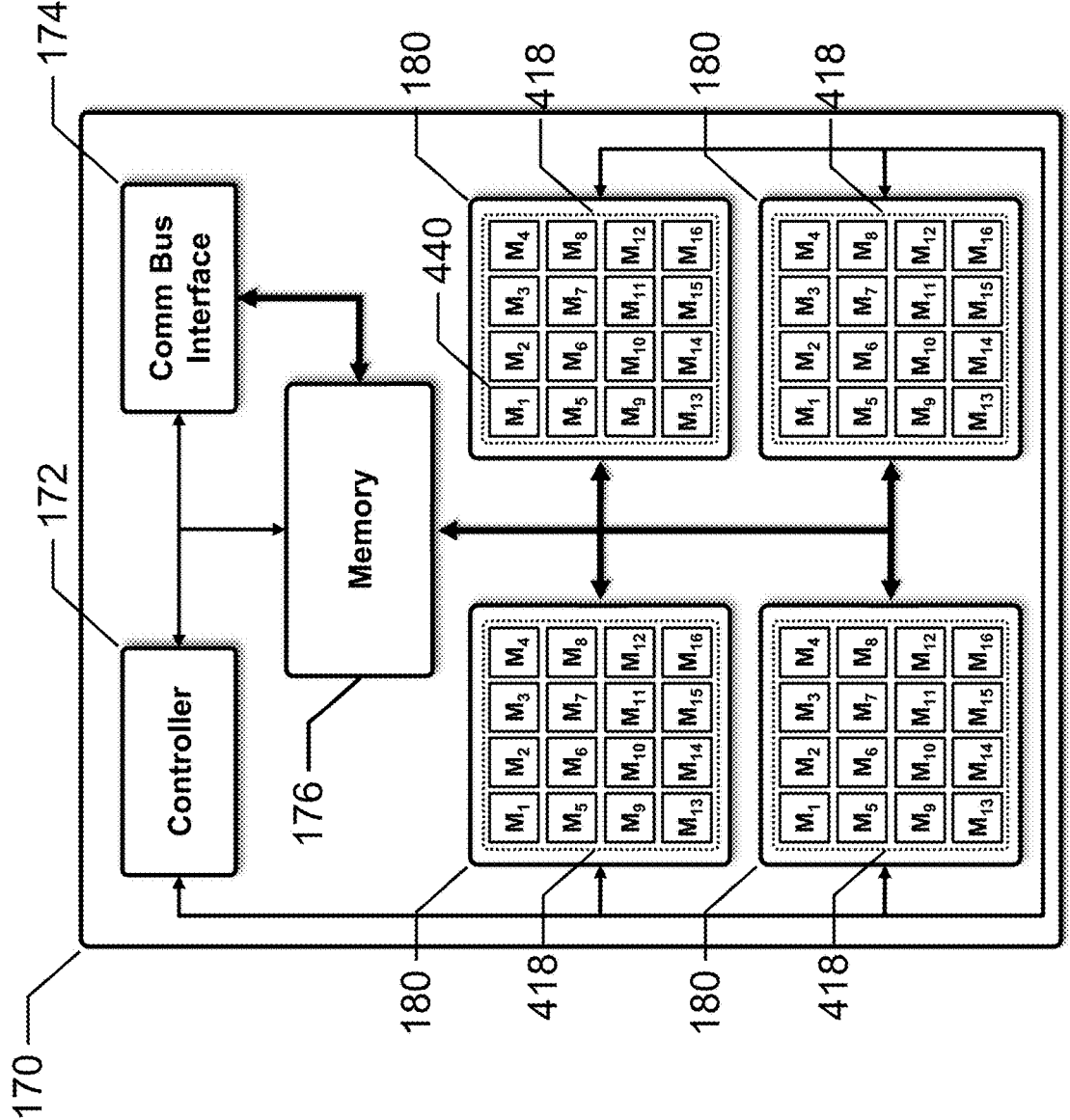
FIG. 8 depicts a block diagram of an analog accelerator, in accordance with an embodiment of the present disclosure.

FIG. 8 depicts an ANN accelerator 170, in accordance with an embodiment of the present disclosure.

ANN accelerator 170 is configured to execute machine learning models, such as, for example, ANNs, CNNs, RNNs, etc., in support of various applications embodied by software modules 134. Generally, ANN accelerator 170 may include one or more processing engines (PEs) 180. Generally, ANN accelerator 170 receives input data from memory 130 over communication bus 110, and transmits output data to memory 130 over communication bus 110.

ANN accelerator 170 also includes controller 172, communications bus interface 174, and one or more non-volatile and/or volatile memories 176, such as, for example, ROM, flash memory, SRAM, DRAM, etc. Controller 172 is coupled to communication bus interface 174, memory 176 and one or more PEs 180, and generally controls the functionality, data flow, etc., of ANN accelerator 170.

Memory 176 is coupled to communication bus interface 174 and PEs 180, and stores, inter alia, ANN weights and activations. Each PE 180 may include one or more CIM array modules $M_i$, such as, for example, CIM array module 400, CIM array module 405, etc.

Computer system 100 may be an embedded system or device that does not include certain elements depicted in FIG. 1, and may include other elements not depicted in FIG. 1. Generally, an embedded system includes communication bus 110, power connector 112 and a power supply (not shown), one or more processors, controllers or microcontrollers 120, memory 130, and communications interface 160. For example, display interface 150, display 152 may not be included in an embedded system (as suggested by the dotted outline). Many embedded systems may also include one or more I/O interfaces 140, as well as sensor and/or actuator devices 142. As discussed above, memory 130 stores software modules that provide functionality when executed by processor 120, such as operating system 132, which may be a real-time operating system, software modules 134, data 136, etc.

Figure 9:
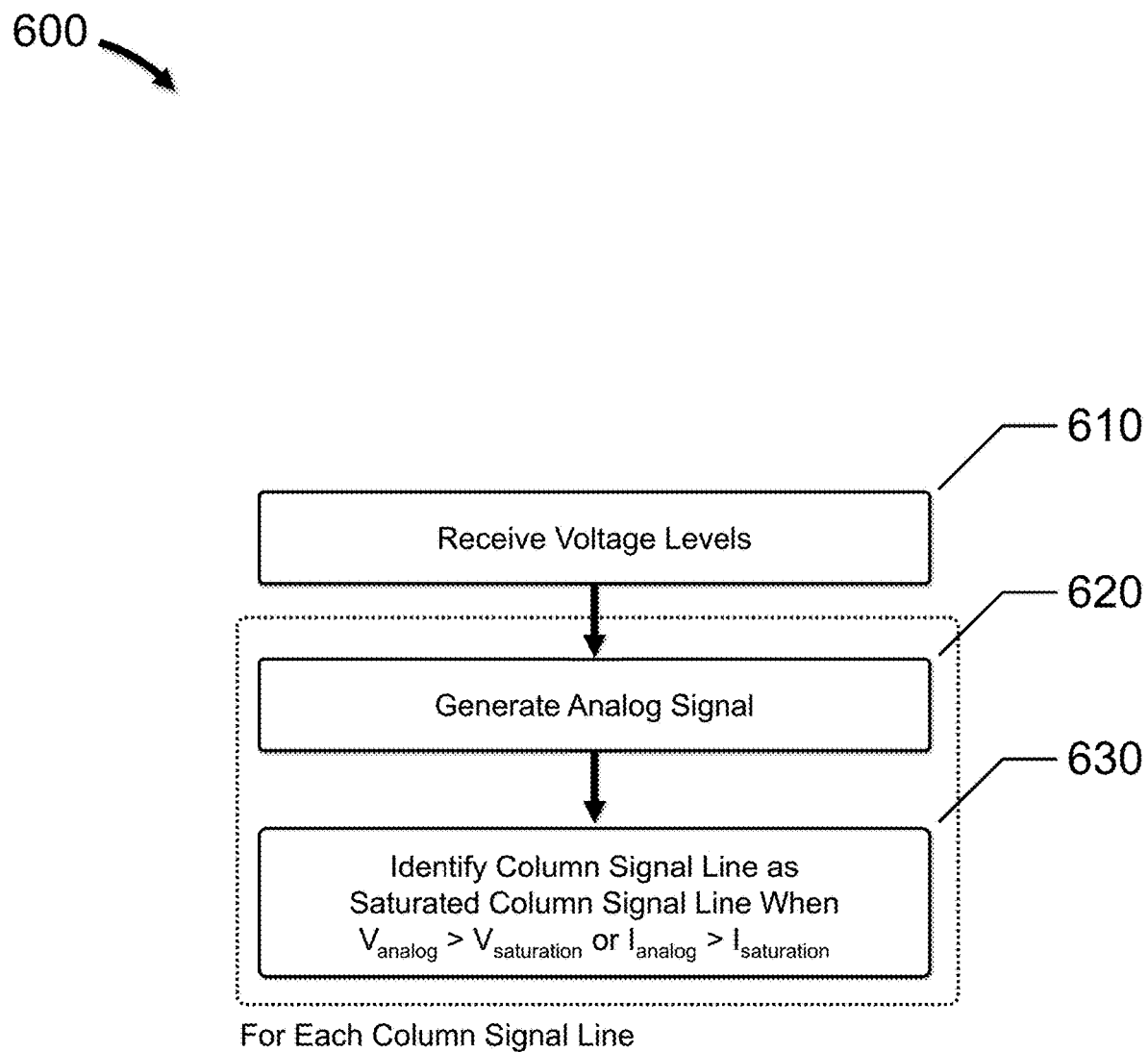
FIG. 9 depicts a flow diagram presenting functionality for performing analog MAC operations using a CIM array module for an ANN accelerator, in accordance with an embodiment of the present disclosure.

FIG. 9 depicts a flow diagram 600 presenting functionality for performing analog MAC operations using a CIM array module 400, 405 for an ANN accelerator, in accordance with an embodiment of the present disclosure.

The functionality at 610 is performed at CIM array 320, 420, and the functionality at 620 to 630 is performed at for each column signal line.

At 610, voltage levels are received. As discussed above, CIM array 320, 420 includes row signal lines 324, column signal lines 322 and cells 326. Each row signal line 324 is configured to receive one of the voltage levels, each column signal line 322 is coupled to an SDU 430, each cell 326 is located at an intersection of a row signal line 324 and a column signal line 322, and each cell 326 has a programmable conductance.

At 620, an analog signal is generated based on the voltage levels applied to row signal lines 324 and the programmable conductances of cells 326 of a respective column signal line 322.

At 630, the column signal line is identified as a saturated column signal line when a voltage of the analog signal is greater than a saturation threshold voltage, or a current of the analog signal is greater than a saturation threshold current.

The embodiments described herein are combinable.

In one embodiment, a method for performing dynamic saturation detection for a CIM array includes providing a plurality of voltage levels to a CIM array including a plurality of selectable row signal lines, a plurality of column signal lines and a plurality of cells, each selectable row signal line configured to receive one of the voltage levels, each cell located at an intersection of a row signal line and a column signal line, each cell having a programmable conductance; and, for each column signal line, generating an analog signal based on the voltage levels received by the selectable row signal lines and the programmable conductances of the cells of the column signal line, and identifying the column signal line as a saturated column signal line when a voltage of the analog signal is greater than a saturation threshold voltage, or a current of the analog signal is greater than a saturation threshold current.

In another embodiment of the method, identifying the column signal line is performed by a plurality of saturation detection units (SDUs), each SDU is selectively coupled to at least one column signal line, and the method further includes, at each SDU, receiving the saturation threshold voltage or saturation threshold current over a reference signal line, or generating the saturation threshold voltage or the saturation threshold current.

In another embodiment of the method, the voltage levels provided to the CIM array are based on input data values, identifying the column signal line includes generating a saturation signal, and the method further includes, during a normal cycle, selecting a set of selectable row signal lines, generating a set of analog signals based on the set of selectable row signal lines, when a saturation signal is generated by at least one SDU, determining, based on the input data values, the saturation signal and the set of selectable row signal lines, an initial subset of selectable row signal lines and a subsequent subset of selectable row signal lines different from the initial subset of selectable row signal lines, and performing an initial partial summation cycle and a subsequent partial summation cycle; during the initial partial summation cycle, selecting the initial subset of selectable row signal lines, and deselecting the subsequent subset of selectable row signal lines; and, during the subsequent partial summation cycle, selecting the subsequent subset of selectable row signal lines, and deselecting the initial subset of selectable row signal lines.

In another embodiment of the method, the method further includes, during the initial partial summation cycle, generating an initial subset of analog signals based on the initial subset of selectable row signal lines, and converting the initial subset of analog signals into initial output data; and, during the subsequent partial summation cycle, generating a subsequent subset of analog signals based on the subsequent subset of selectable row signal lines, converting the subsequent subset of analog signals into subsequent output data, and combining the initial output data and the subsequent output data to generate final output data.

In another embodiment of the method, the voltage levels provided to the CIM array are based on input data values, said identifying the column signal line includes generating a saturation signal, and the method further includes, during a normal cycle, selecting a set of selectable row signal lines, generating a set of analog signals based on the set of selectable row signal lines, when a saturation signal is generated by at least one SDU, determining, based on the input data values, the saturation signal and the set of selectable row signal lines, at least two unique sets of selectable row signal lines, and performing a partial summation cycle for each unique set of selectable row signal lines; during each partial summation cycle, selecting one of the unique sets of selectable row signal lines, deselecting all other unique sets of selectable row signal lines, generating a set of analog signals based on the selected unique set of selectable row signal lines, and converting the set of analog signals into partial output data; and, after a last partial summation cycle, combining the partial output data for each partial summation cycle to generate final output data.

In another embodiment of the method, the CIM array includes a reference column signal line, a plurality of reference row signal lines and a plurality of reference cells, where each reference cell is located at an intersection of a reference row signal line and the reference column signal line, where each reference cell has a programmable conductance, and where the method further includes, at a saturation reference unit (SRU), generating an analog signal based on a voltage level provided to the reference row signal lines and the programmable conductances of the reference cells of the reference column signal line; generating, based on the analog signal, the saturation threshold voltage or the saturation threshold current; and outputting, over the reference signal line, the saturation threshold voltage or the saturation threshold current.

In another embodiment of the method, the voltage level provided to the reference row signal lines is equal to or greater than a maximum voltage level provided to the CIM array.

In another embodiment of the method, the method further includes programming all of the reference cells to a conductance value between a minimum conductance value and a maximum conductance value; or programming a first set of reference cells to a maximum conductance value, and programming a second set of reference cells to a minimum conductance value.

In another embodiment of the method, the voltage levels are provided to the CIM array by a plurality of digital-to-analog converters (DACs), said converting the set of analog signals into output data is performed by a plurality of analog-to-digital converters (ADCs), each ADC is coupled to a respective SDU, and the method further includes, at the CIM array, programming the conductance of each cell to represent one element of a sparse weight matrix; at each DAC, receiving an input data value representing one element of a input data matrix, converting the input data value to a voltage level, and providing the voltage level to a respective row signal line; and, at each ADC, receiving an analog signal from a respective SDU, the analog signal proportional to a dot product of one row or column of the sparse weight matrix and one column or row of the input data matrix, and generating, based on the analog signal, an output data value representing one element of an output data matrix.

In another embodiment of the method, the input data matrix or the sparse weight matrix has a sparsity of about 50% or more.

In another embodiment of the method, each SDU includes a capacitor that has a capacitance less than a predetermined capacitance; and each ADC having a resolution less than a predetermined resolution.

In one embodiment, a CIM array module includes a CIM array, including a plurality of selectable row signal lines, a plurality of column signal lines and a plurality of cells, each selectable row signal line configured to receive a voltage level, each cell disposed at an intersection of a row signal line and a column signal line, each cell having a programmable conductance; and a plurality of saturation detection units (SDUs), each SDU selectively coupled to at least one column signal line, each SDU configured to, for each column signal line, generate an analog signal based on the voltage levels received by the selectable row signal lines and the programmable conductances of the cells of the column signal line, and identify the column signal line as a saturated column signal line when a voltage of the analog signal is greater than a saturation threshold voltage, or a current of the analog signal is greater than a saturation threshold current.

In another embodiment of the CIM array module, each SDU is configured to receive the saturation threshold voltage or saturation threshold current over a reference signal line; or generate the saturation threshold voltage or the saturation threshold current.

In another embodiment of the CIM array module, the voltage levels received by the CIM array are based on input data values, said identify the column signal line includes generate a saturation signal, and the CIM array module further comprises a controller, coupled to the selectable row signal lines, configured to, during a normal cycle, select a set of selectable row signal lines, generate a set of analog signals based on the set of selectable row signal lines, when a saturation signal is generated by at least one SDU, determine, based on the input data values, the saturation signal and the set of selectable row signal lines, an initial subset of selectable row signal lines and a subsequent subset of selectable row signal lines different from the initial subset of selectable row signal lines, and perform an initial partial summation cycle and a subsequent partial summation cycle; during the initial partial summation cycle, select the initial subset of selectable row signal lines, and deselect the subsequent subset of selectable row signal lines; and, during the subsequent partial summation cycle, select the subsequent subset of selectable row signal lines, and deselect the initial subset of selectable row signal lines.

In another embodiment of the CIM array module, during the initial partial summation cycle, the SDUs are configured to generate an initial subset of analog signals based on the initial subset of selectable row signal lines, and a plurality of analog-to-digital converters (ADCs), coupled to the SDUs, are configured to convert the initial subset of analog signals into initial output data; and, during the subsequent partial summation cycle, the SDUs are configured to generate a subsequent subset of analog signals based on the subsequent subset of selectable row signal lines, the ADCs are configured to convert the subsequent subset of analog signals into subsequent output data, and the controller is configured to combine the initial output data and the subsequent output data to generate final output data.

In another embodiment of the CIM array module, the CIM array module further includes a controller coupled to the selectable row signal lines; and a plurality of analog-to-digital converters (ADCs) coupled to the SDUs, where the voltage levels received by the CIM array are based on input data values; where identify the column signal line includes generate a saturation signal; where, during a normal cycle, the controller is configured to select a set of selectable row signal lines, when a saturation signal is generated by at least one SDU, determine, based on the input data values, the saturation signal and the set of selectable row signal lines, at least two unique sets of selectable row signal lines, and perform a partial summation cycle for each unique set of selectable row signal lines; where, during each partial summation cycle, the controller is configured to select one of the unique sets of selectable row signal lines, and deselect all other unique sets of selectable row signal lines; the SDUs are configured to generate a set of analog signals based on the selected unique set of selectable row signal lines; and the ADCs are configured to convert the set of analog signals into partial output data; and, where, after a last partial summation cycle, the controller is configured to combine the partial output data for each partial summation cycle to generate final output data.

In another embodiment of the CIM array module, the CIM array includes a reference column signal line, a plurality of reference row signal lines and a plurality of reference cells; each reference cell is located at an intersection of a reference row signal line and the reference column signal line; each reference cell has a programmable conductance; and the CIM array module further includes a saturation reference unit (SRU) configured to generate an analog signal based on a voltage level received by the reference row signal lines and the programmable conductances of the reference cells of the reference column signal line, generate, based on the analog signal, the saturation threshold voltage or the saturation threshold current, and output, over the reference signal line, the saturation threshold voltage or the saturation threshold current.

In another embodiment of the CIM array module, the voltage level received by the reference row signal lines is equal to a maximum voltage level received by the CIM array.

In another embodiment of the CIM array module, all of the reference cells are programmed to a conductance value between a minimum conductance value and a maximum conductance value; or a first set of reference cells is programmed to a maximum conductance value, and a second set of reference cells is programmed to a minimum conductance value.

In another embodiment of the CIM array module, the voltage levels received by the CIM array are provided by a plurality of digital-to-analog converters (DACs); the conductance of each cell of the CIM array is programmed to represent one element of a sparse weight matrix; each DAC is configured to receive an input data value representing one element of a input data matrix, convert the input data value to a voltage level, and provide the voltage level to a respective row signal line; and each ADC is configured to receive an analog signal from a respective SDU, the analog signal proportional to a dot product of one row or column of the sparse weight matrix and one column or row of the input data matrix, and generate, based on the analog signal, an output data value representing one element of an output data matrix.

In another embodiment of the CIM array module, the input data matrix or the sparse weight matrix has a sparsity of about 50% or more.

In another embodiment of the CIM array module, each SDU includes a capacitor that has a capacitance less than a predetermined capacitance; and each ADC having a resolution less than a predetermined resolution.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A compute-in-memory (CIM) array module for an artificial neural network (ANN) accelerator, comprising:
    a CIM array including a plurality of row signal lines, a plurality of column signal lines, and a plurality of cells, each cell located at an intersection of a row signal line and a column signal line, each cell having a conductance that is programmable between a minimum conductance value and a maximum conductance value;

a plurality of digital-to-analog converters (DACs), each DAC configured to receive an input data value, convert the input data value to a voltage level, and apply the voltage level to a respective row signal line;

a plurality of analog-to-digital converters (ADCs), each ADC configured to receive a sampled signal via a sampled signal line, and generate an output data value based on the sampled signal;

a plurality of saturation detection units (SDUs), each SDU including a capacitor and a comparator, the capacitor selectively coupled to a respective column signal line and a respective sampled signal line, the comparator selectively coupled to the respective column signal line and coupled to a reference voltage signal line and a saturation signal line, each SDU configured to:
generate an analog signal based on the voltage levels applied to the row signal lines and the conductances of the cells of the respective column signal line,
generate a respective sampled signal based on the analog signal,
transmit the respective sampled signal, via the sampled signal line, to a respective ADC,
receive a reference voltage signal from the reference voltage signal line, the reference voltage signal having a voltage level that indicates a saturation threshold,
determine whether a voltage level of the sampled signal is greater than the voltage level of the reference voltage signal, and
transmit a saturation signal, via the respective saturation signal line, when the voltage level of the sampled signal is greater than the voltage level of the reference voltage signal; and a controller, coupled to the SDUs, configured to receive the saturation signals.

2. The CIM array module of claim 1, where the CIM array is a non-volatile memory (NVM) crossbar array module and the plurality of cells is a plurality of NVM cells, with:
each input data value is one element of a sparse input data matrix;
each output data value is one element of an output data matrix;
the conductance of each NVM cell is programmable to represent one element of a sparse weight matrix; and
the analog signal generated by each SDU has a current that is proportional to a dot product of one row or column of the sparse weight matrix and one column or row of the sparse input data matrix.

3. The CIM array module of claim 2, where the sparse input data matrix and the sparse weight matrix have a sparsity of about 50%.

4. The CIM array module of claim 2, where the saturation threshold is based on a size of the capacitor of each SDU.

5. The CIM array module of claim 4, further comprising:
a plurality of switches coupled to the controller via switch control lines, each switch coupled to an input port of a respective DAC,
where the controller is configured to:
during a normal processing cycle:
transmit a close switch control signal to each switch, and
determine whether at least one saturation signal is received from at least one SDU,
during a first saturation processing cycle:
determine, based on the input data values, which row signal lines and switches are associated with the saturation signal,
transmit a close switch control signal to a first set of switches associated with the saturation signal, and an open switch control signal to the remaining switches, and
during a second saturation processing cycle:
transmit a close switch control signal to a second set of switches associated with the saturation signal, and an open switch control signal to the remaining switches.

6. The CIM array module of claim 4, where the CIM array includes:
a reference column signal line;
a plurality of reference row signal lines; and
a plurality of reference NVM cells, each reference NVM cell located at an intersection of a reference row signal line and the reference column signal line, each reference NVM cell having a conductance that is programmable.

7. The CIM array module of claim 6, further comprising:
a saturation reference unit (SRU), including a capacitor coupled to the reference column signal line and the reference voltage signal line, configured to:
generate an analog signal based on a voltage level applied to the reference row signal lines and the conductances of the reference NVM cells of the reference column signal line,
generate the reference voltage signal based on the analog signal, and
transmit the reference voltage signal, via the reference voltage signal line, to each SDU.

8. The CIM array module of claim 7, where a voltage level applied to the reference row signal lines is equal to a maximum voltage level output by the DACs.

9. The CIM array module of claim 8, where a first set of reference NVM cells are programmed to the maximum conductance value, and a second set of reference NVM cells are programmed to the minimum conductance value.

10. The CIM array module of claim 8, where all of the reference NVM cells are programmed to a conductance value between the minimum conductance value and the maximum conductance value.

11. A method for performing analog multiply-and-accumulate (MAC) operations using a compute-in-memory (CIM) array module for an artificial neural network (ANN) accelerator, comprising:
at a plurality of digital-to-analog converters (DACs):
receiving, at each DAC, an input data value;
converting, at each DAC, the input data value to a voltage level;
at a CIM array:
receiving the voltage levels from the DACs, the CIM array including a plurality of row signal lines, a plurality of column signal lines and a plurality of cells, each row signal line coupled to a respective DAC, each column signal line coupled to a respective saturation detection unit (SDU), each cell located at an intersection of a row signal line and a column signal line, each cell having a conductance;
at each SDU:
generating an analog signal based on the voltage levels applied to the row signal lines and the conductances of the cells of a respective column signal line;
generating a sampled signal based on the analog signal;

transmitting the sampled signal to a respective analog-to-digital converter (ADC);
receiving a reference voltage signal having a voltage level that indicates a saturation threshold;
determining whether a voltage level of the sampled signal is greater than the voltage level of the reference voltage signal;
transmitting a saturation signal to a controller when the voltage level of the sampled signal is greater than the voltage level of the reference voltage signal; and at each ADC:
generating an output data value based on the sampled signal.

12. The method of claim 11, where the CIM array is a non-volatile memory (NVM) crossbar array module and the plurality of cells is a plurality of NVM cells, with:
each input data value is one element of a sparse input data matrix;
each output data value is one element of an output data matrix;
the conductance of each NVM cell is programmable to represent one element of a sparse weight matrix; and
the analog signal generated by each SDU has a current that is proportional to a dot product of one row or column of the sparse weight matrix and one column or row of the sparse input data matrix.

13. The method of claim 12, where the sparse input data matrix and the sparse weight matrix have a sparsity of about 50%.

14. The method of claim 12, where the saturation threshold is based on a size of a capacitor of each SDU.

15. The method of claim 14, where a plurality of switches are coupled to
the controller, each switch is coupled to an input port of a respective DAC,
and the method further comprises:
at the controller:
during a normal processing cycle:
transmitting a close switch control signal to each switch, and
determining whether at least one saturation signal is received from at least one SDU,
during a first saturation processing cycle:
determining, based on the input data values, which row signal lines and switches are associated with the saturation signal,
transmitting a close switch control signal to a first set of switches associated with the saturation signal, and an open switch control signal to the remaining switches, and
during a second saturation processing cycle:
transmitting a close switch control signal to a second set of switches associated with the saturation signal, and an open switch control signal to the remaining switches.

16. The method of claim 14, where the CIM array includes a reference column signal line, a plurality of reference row signal lines, and a plurality of reference NVM cells, each reference NVM cell located at an intersection of a reference row signal line and the reference column signal line, each reference NVM cell having a conductance that is programmable, and the method further comprises:
at a saturation reference unit (SRU):
generating an analog signal based on a voltage level applied to the reference row signal lines and the conductances of the reference NVM cells of the reference column signal line;
generating the reference voltage signal based on the analog signal; and
transmitting the reference voltage signal to each SDU.

17. The method of claim 16, where a voltage level applied to the reference row signal lines is equal to a maximum voltage level output by the DACs.

18. The method of claim 17, where a first set of reference NVM cells are programmed to a maximum conductance value, and a second set of reference NVM cells are programmed to a minimum conductance value.

19. The method of claim 17, where all of the reference NVM cells are programmed to a conductance value between a minimum conductance value and a maximum conductance value.

20. A non-volatile memory (NVM) array module for an artificial neural network (ANN) accelerator, comprising:
an NVM crossbar array, including:
a plurality of row signal lines, each row signal line configured to receive a voltage level from a respective digital-to-analog converter,
a plurality of column signal lines, and
a plurality of NVM cells, each NVM cell disposed at an intersection of a row signal line and a column signal line, each NVM cell having a programmable conductance; and
a plurality of saturation detection units (SDUs), each SDU coupled to a respective column signal line and configured to:
generate an analog signal based on the voltage levels received by the row signal lines and the programmable conductances of the NVM cells of the respective column signal line,
generate a sampled signal based on the analog signal,
transmit the sampled signal to a respective analog-to-digital converter,
receive a reference voltage signal having a voltage level that indicates a saturation threshold,
determine whether a voltage level of the sampled signal is greater than the voltage level of the reference voltage signal, and
transmit a saturation signal to a controller when the voltage level of the sampled signal is greater than the voltage level of the reference voltage signal.

* * * * *